United States Patent
Christmas et al.

(10) Patent No.: US 10,979,466 B2
(45) Date of Patent: Apr. 13, 2021

(54) DEVICE PRESENTATION WITH REAL-TIME FEEDBACK

(71) Applicant: Fasetto, Inc., Superior, WI (US)

(72) Inventors: Coy Christmas, Superior, WI (US); Luke Malpass, Stoke-on-Trent (GB)

(73) Assignee: Fasetto, Inc., Superior, WI (US)

( * ) Notice: Subject to any disclaimer, the term of this patent is extended or adjusted under 35 U.S.C. 154(b) by 0 days.

(21) Appl. No.: 16/387,464

(22) Filed: Apr. 17, 2019

(65) Prior Publication Data

US 2019/0319993 A1 Oct. 17, 2019

Related U.S. Application Data

(60) Provisional application No. 62/659,022, filed on Apr. 17, 2018.

(51) Int. Cl.
*H04L 29/06* (2006.01)

(52) U.S. Cl.
CPC .................. *H04L 65/40* (2013.01)

(58) Field of Classification Search
CPC ..................................... H04L 65/40
See application file for complete search history.

(56) References Cited

U.S. PATENT DOCUMENTS

| | | |
|---|---|---|
| 5,003,596 A | 3/1991 | Wood |
| 5,303,388 A | 4/1994 | Kreitman |
| 5,664,228 A | 9/1997 | Mital |
| 5,678,015 A | 10/1997 | Goh |
| 5,689,287 A | 11/1997 | Mackinlay |
| 5,689,654 A | 11/1997 | Kikinis et al. |
| 5,729,471 A | 3/1998 | Jain |
| 5,861,783 A | 1/1999 | Dan Kikinis |
| 5,956,038 A | 9/1999 | Rekimoto |
| 5,963,215 A | 10/1999 | Rosenzweig |
| 5,982,295 A | 11/1999 | Goto et al. |
| 6,002,403 A | 12/1999 | Sugiyama |
| 6,008,809 A | 12/1999 | Brooks |
| 6,029,183 A | 2/2000 | Jenkins |
| 6,160,488 A | 12/2000 | Honda |

(Continued)

FOREIGN PATENT DOCUMENTS

| | | |
|---|---|---|
| AU | 2013352236 | 11/2018 |
| CN | 103945003 | 7/2001 |

(Continued)

OTHER PUBLICATIONS

USPTO; Non-Final Office Action dated Sep. 30, 2019 in U.S. Appl. No. 16/152,342.

(Continued)

*Primary Examiner* — Anil K Bhargava
(74) *Attorney, Agent, or Firm* — Snell & Wilmer L.L.P.

(57) ABSTRACT

A system and method for sharing presentations and other content is disclosed. In various exemplary embodiments, the system comprises a software program that enables a presenter to share content from a computer or other mobile device and to a number of different viewers, each of which has his or her own computer or mobile computing device that can display the presentation on the device. In yet other embodiments, the viewers of the presentation can communicate with the presenter via the computers or mobile computing devices.

21 Claims, 12 Drawing Sheets

(56) References Cited

U.S. PATENT DOCUMENTS

| | | |
|---|---|---|
| 6,489,932 B1 | 12/2002 | Chitturi |
| 6,497,367 B2 | 12/2002 | Conzola et al. |
| 6,581,068 B1 | 6/2003 | Bensoussan |
| 6,597,358 B2 | 7/2003 | Miller |
| 6,652,170 B1 | 11/2003 | Arnold |
| 6,710,788 B1 | 3/2004 | Freach et al. |
| 6,922,815 B2 | 7/2005 | Rosen |
| 6,938,218 B1 | 8/2005 | Rosen |
| 7,054,963 B2 | 5/2006 | Betts-Lacroix |
| 7,134,095 B1 | 11/2006 | Smith |
| 7,149,836 B2 | 12/2006 | Yu et al. |
| 7,216,305 B1 | 5/2007 | Jaeger |
| 7,428,702 B1 | 9/2008 | Cervantes et al. |
| 7,480,872 B1 | 1/2009 | Ubillos |
| 7,516,484 B1 | 4/2009 | Arnouse |
| 7,533,408 B1 | 5/2009 | Arnouse |
| 7,725,839 B2 | 5/2010 | Michaels |
| 7,761,813 B2 | 7/2010 | Kim |
| D654,931 S | 2/2012 | Lemelman |
| 8,111,255 B2 | 2/2012 | Park |
| 8,117,563 B2 | 2/2012 | Ok |
| 8,264,488 B2 | 9/2012 | Ueno |
| 8,386,686 B2 | 2/2013 | Lin |
| 8,390,255 B1 | 3/2013 | Fathollahi |
| 8,405,502 B2 | 3/2013 | Teague |
| 8,483,758 B2 | 7/2013 | Huang |
| 8,497,859 B1 | 7/2013 | Hickman et al. |
| 8,510,680 B2 | 8/2013 | Kang |
| 8,587,590 B2 | 11/2013 | Erickson et al. |
| 8,614,885 B2 | 12/2013 | Solomon |
| 8,634,883 B2 | 1/2014 | Hong |
| 8,699,218 B2 | 4/2014 | Xu |
| 8,745,535 B2 | 6/2014 | Chaudhri |
| 8,810,430 B2 | 8/2014 | Proud |
| 8,924,862 B1 | 12/2014 | Luo |
| 8,935,438 B1 | 1/2015 | Ivanchenko |
| 8,996,795 B2 | 3/2015 | Mardiks |
| 9,047,050 B2 | 6/2015 | Medica |
| 9,178,976 B2 | 11/2015 | Djordjevic |
| 9,247,303 B2 | 1/2016 | Phang |
| 9,288,295 B2 | 3/2016 | Ivanovski |
| 9,356,267 B1 | 5/2016 | To |
| 9,360,991 B2 | 6/2016 | Celebisoy |
| 9,378,588 B2 | 6/2016 | Song |
| 9,390,082 B1 | 7/2016 | Stolte et al. |
| 9,405,435 B2 | 8/2016 | Hendricks |
| 9,437,038 B1 | 9/2016 | Costello |
| 9,495,375 B2 | 11/2016 | Huang |
| 9,516,151 B2 | 12/2016 | Moran |
| 9,584,402 B2 | 2/2017 | Christmas et al. |
| 9,626,341 B1 | 4/2017 | Guan et al. |
| 9,658,651 B2 | 5/2017 | Balogh |
| 9,684,887 B2 | 6/2017 | Majeti et al. |
| 9,886,229 B2 | 2/2018 | Christmas |
| 10,075,502 B2 | 9/2018 | Malpass |
| 10,084,688 B2 | 9/2018 | Christmas et al. |
| 10,095,873 B2 | 10/2018 | Christmas et al. |
| 10,122,483 B2 * | 11/2018 | Gonzales, Jr. ........ H04N 21/466 |
| 10,123,153 B2 | 11/2018 | Christmas et al. |
| 10,231,013 B2 * | 3/2019 | Besehanic ........... H04N 21/435 |
| 10,411,406 B1 | 9/2019 | Hill |
| 2001/0028369 A1 | 10/2001 | Gallo et al. |
| 2001/0033654 A1 | 10/2001 | Wieser |
| 2001/0044578 A1 | 11/2001 | Ben-Haim |
| 2002/0085681 A1 | 7/2002 | Jensen |
| 2002/0105529 A1 | 8/2002 | Bowser et al. |
| 2002/0105551 A1 | 8/2002 | Kamen |
| 2002/0138543 A1 | 9/2002 | Teng |
| 2003/0074529 A1 | 4/2003 | Crohas |
| 2003/0126272 A1 | 7/2003 | Cori et al. |
| 2003/0126335 A1 | 7/2003 | Silvester |
| 2003/0131050 A1 | 7/2003 | Vincent |
| 2003/0141978 A1 | 7/2003 | D'Agosto |
| 2003/0142136 A1 | 7/2003 | Carter |
| 2003/0217097 A1 | 11/2003 | Eitel |
| 2004/0088280 A1 | 5/2004 | Koh et al. |
| 2004/0104932 A1 | 6/2004 | Brebner |
| 2004/0205091 A1 | 10/2004 | Mulcahy |
| 2005/0005246 A1 | 1/2005 | Card |
| 2005/0076216 A1 | 4/2005 | Nyberg |
| 2005/0097008 A1 | 5/2005 | Ehring |
| 2005/0185364 A1 | 8/2005 | Bell |
| 2005/0224589 A1 | 10/2005 | Park et al. |
| 2005/0237704 A1 | 10/2005 | Ceresoli |
| 2005/0271207 A1 | 12/2005 | Frey |
| 2006/0020888 A1 | 1/2006 | Kang et al. |
| 2006/0057960 A1 | 3/2006 | Tran |
| 2006/0075225 A1 | 4/2006 | Flynn et al. |
| 2006/0085741 A1 | 4/2006 | Weiner |
| 2006/0090122 A1 | 4/2006 | Pyhalammi et al. |
| 2006/0112270 A1 | 5/2006 | Erez |
| 2006/0130004 A1 | 6/2006 | Hughes et al. |
| 2006/0149825 A1 | 7/2006 | Kim |
| 2006/0159028 A1 * | 7/2006 | Curran-Gray ......... H04L 43/026 370/252 |
| 2006/0161631 A1 | 7/2006 | Lira |
| 2006/0193472 A1 | 8/2006 | Yuen |
| 2006/0200518 A1 | 9/2006 | Sinclair et al. |
| 2006/0239275 A1 | 10/2006 | Zlateff et al. |
| 2006/0239375 A1 | 10/2006 | Kim et al. |
| 2006/0294386 A1 | 12/2006 | Yuval et al. |
| 2007/0050778 A1 | 3/2007 | Lee |
| 2007/0120846 A1 | 5/2007 | Ok et al. |
| 2007/0130541 A1 | 6/2007 | Louch |
| 2007/0158408 A1 | 7/2007 | Wang et al. |
| 2007/0160198 A1 | 7/2007 | Orsini et al. |
| 2007/0168614 A1 | 7/2007 | Jianjun et al. |
| 2007/0245048 A1 | 10/2007 | Mezet et al. |
| 2007/0271580 A1 | 11/2007 | Tischer et al. |
| 2007/0273675 A1 | 11/2007 | Wangler |
| 2007/0279852 A1 | 12/2007 | Daniel et al. |
| 2007/0282601 A1 | 12/2007 | Li |
| 2008/0024976 A1 | 1/2008 | Hardson et al. |
| 2008/0069358 A1 | 3/2008 | Yang |
| 2008/0080709 A1 | 4/2008 | Michtchenko et al. |
| 2008/0181141 A1 | 7/2008 | Krantz |
| 2008/0186305 A1 | 8/2008 | Carter |
| 2008/0222238 A1 | 9/2008 | Ivanov et al. |
| 2008/0223890 A1 | 9/2008 | Tecchiolli et al. |
| 2008/0235629 A1 | 9/2008 | Porter et al. |
| 2008/0241809 A1 | 10/2008 | Ashmore |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar |
| 2009/0009605 A1 | 1/2009 | Ortiz |
| 2009/0089692 A1 | 4/2009 | Morris |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He |
| 2009/0240598 A1 | 12/2009 | Kargman |
| 2009/0300025 A1 | 12/2009 | Rothschild et al. |
| 2010/0007768 A1 | 1/2010 | Yong et al. |
| 2010/0020035 A1 | 1/2010 | Ryu et al. |
| 2010/0050129 A1 | 2/2010 | Li et al. |
| 2010/0078343 A1 | 4/2010 | Hoellwarth |
| 2010/0088634 A1 | 4/2010 | Tsuruta |
| 2010/0093412 A1 | 4/2010 | Serra |
| 2010/0122207 A1 | 5/2010 | Kim et al. |
| 2010/0153449 A1 | 6/2010 | Baba et al. |
| 2010/0161743 A1 | 6/2010 | Krishnamurthi |
| 2010/0169639 A1 | 7/2010 | Jeffries |
| 2010/0169836 A1 | 7/2010 | Stallings |
| 2010/0225735 A1 | 9/2010 | Shaffer |
| 2010/0238089 A1 | 9/2010 | Massand |
| 2010/0256624 A1 | 10/2010 | Brannon |
| 2010/0268929 A1 | 10/2010 | Fumiyoshi |
| 2010/0281138 A1 | 11/2010 | Froirntchuk et al. |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |

(56) References Cited

U.S. PATENT DOCUMENTS

| | | |
|---|---|---|
| 2011/0063211 A1 | 3/2011 | Hoerl et al. |
| 2011/0090534 A1 | 4/2011 | Terao et al. |
| 2011/0107269 A1 | 5/2011 | Chin et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark |
| 2011/0179368 A1 | 7/2011 | King et al. |
| 2011/0252098 A1 | 10/2011 | Kumar |
| 2011/0256905 A1 | 10/2011 | Ryan |
| 2011/0283208 A1 | 11/2011 | Gallo |
| 2011/0287808 A1 | 11/2011 | Huang |
| 2011/0294474 A1 | 12/2011 | Barany et al. |
| 2011/0295392 A1* | 12/2011 | Cunnington ............ H04N 7/15 700/90 |
| 2011/0296339 A1 | 12/2011 | Kang |
| 2011/0310100 A1 | 12/2011 | Adimatyam et al. |
| 2012/0011200 A1 | 1/2012 | Zhang et al. |
| 2012/0034897 A1 | 2/2012 | Kreitzer |
| 2012/0047517 A1 | 2/2012 | Townsend et al. |
| 2012/0098754 A1 | 4/2012 | Kim |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel |
| 2012/0209630 A1 | 8/2012 | Ihm et al. |
| 2012/0242845 A1 | 9/2012 | Tan |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2012/0310446 A1 | 12/2012 | Murphy |
| 2013/0028419 A1 | 1/2013 | Das |
| 2013/0050117 A1 | 2/2013 | Cho et al. |
| 2013/0073692 A1 | 3/2013 | Isaza |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer |
| 2013/0145171 A1 | 6/2013 | Hsien |
| 2013/0145384 A1* | 6/2013 | Krum ............... G06Q 30/02 725/10 |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0173798 A1* | 7/2013 | Micucci ............... H04L 63/10 709/225 |
| 2013/0201176 A1 | 8/2013 | Lee |
| 2013/0205277 A1 | 8/2013 | Seven et al. |
| 2013/0212112 A1 | 8/2013 | Blom |
| 2013/0217448 A1 | 8/2013 | Kim |
| 2013/0219479 A1 | 8/2013 | Desoto et al. |
| 2013/0227420 A1* | 8/2013 | Pasquero ............ G06Q 10/10 715/730 |
| 2013/0235037 A1 | 9/2013 | Baldwin |
| 2013/0238711 A1 | 9/2013 | Lashkari et al. |
| 2013/0256403 A1 | 10/2013 | Mackinnon |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0268955 A1* | 10/2013 | Conrad ............ H04N 21/8456 725/12 |
| 2013/0272196 A1 | 10/2013 | Li |
| 2013/0273983 A1 | 10/2013 | Hsu |
| 2013/0290440 A1 | 10/2013 | Pratt et al. |
| 2013/0300740 A1 | 11/2013 | Snyder |
| 2013/0303160 A1 | 11/2013 | Fong |
| 2013/0317835 A1 | 11/2013 | Matthew |
| 2013/0346911 A1 | 12/2013 | Sripada |
| 2014/0012913 A1 | 1/2014 | Varoglu et al. |
| 2014/0026204 A1 | 1/2014 | Buntinx et al. |
| 2014/0034531 A1 | 2/2014 | Ching-Chang Wang |
| 2014/0039804 A1 | 2/2014 | Park et al. |
| 2014/0040777 A1 | 2/2014 | Jones |
| 2014/0052522 A1 | 2/2014 | Irani et al. |
| 2014/0052618 A1 | 2/2014 | Drozd et al. |
| 2014/0055822 A1 | 2/2014 | Hannaway et al. |
| 2014/0078136 A1 | 3/2014 | Sohn |
| 2014/0082547 A1 | 3/2014 | Ding |
| 2014/0106677 A1 | 4/2014 | Altman |
| 2014/0121858 A1 | 5/2014 | Chen |
| 2014/0123033 A1 | 5/2014 | Ross |
| 2014/0132594 A1 | 5/2014 | Gharpure |
| 2014/0132736 A1 | 5/2014 | Chang |
| 2014/0136429 A1 | 5/2014 | Psihos |
| 2014/0141713 A1 | 5/2014 | Shirinfar |
| 2014/0156725 A1 | 6/2014 | Mandyam |
| 2014/0189532 A1 | 7/2014 | Sivaraman et al. |
| 2014/0207657 A1 | 7/2014 | Gacs et al. |
| 2014/0218356 A1 | 8/2014 | Distler |
| 2014/0232817 A1 | 8/2014 | Jones |
| 2014/0258938 A1 | 9/2014 | Christmas |
| 2014/0337640 A1 | 11/2014 | Sharma |
| 2014/0351181 A1 | 11/2014 | Canoy et al. |
| 2014/0355761 A1 | 12/2014 | Kawamura et al. |
| 2015/0009531 A1 | 1/2015 | Kawaguchi |
| 2015/0012617 A1 | 1/2015 | Park et al. |
| 2015/0015368 A1 | 1/2015 | Roth |
| 2015/0019628 A1 | 1/2015 | Li |
| 2015/0082399 A1 | 3/2015 | Wu |
| 2015/0095777 A1 | 4/2015 | Lim |
| 2015/0101018 A1 | 4/2015 | Forte |
| 2015/0106837 A1 | 4/2015 | Li |
| 2015/0133000 A1 | 5/2015 | Kim |
| 2015/0145889 A1 | 5/2015 | Hanai |
| 2015/0177362 A1 | 6/2015 | Gutierrez |
| 2015/0194833 A1 | 7/2015 | Fathollahi et al. |
| 2015/0271271 A1 | 9/2015 | Bullota |
| 2015/0271299 A1 | 9/2015 | Bullota |
| 2015/0271307 A1 | 9/2015 | Berg |
| 2015/0279470 A1 | 10/2015 | Cerrelli et al. |
| 2015/0281439 A1 | 10/2015 | Dudai |
| 2015/0339867 A1 | 11/2015 | Amon |
| 2015/0367230 A1 | 12/2015 | Bradford |
| 2015/0382169 A1 | 12/2015 | Burba |
| 2016/0014574 A1 | 1/2016 | Christmas et al. |
| 2016/0037055 A1 | 2/2016 | Waddington |
| 2016/0100279 A1 | 4/2016 | Christmas et al. |
| 2016/0134941 A1 | 5/2016 | Selvaraj |
| 2016/0162244 A1 | 6/2016 | Christmas |
| 2016/0188468 A1 | 6/2016 | Rao |
| 2016/0195899 A1 | 7/2016 | Plante |
| 2016/0198322 A1 | 7/2016 | Pitis |
| 2016/0226730 A1 | 8/2016 | Schumacher |
| 2016/0260319 A1 | 9/2016 | Jeffery |
| 2016/0269468 A1 | 9/2016 | Malpass |
| 2017/0034167 A1 | 2/2017 | Helder Silvestre Paiva |
| 2017/0134803 A1* | 5/2017 | Shaw ............... H04N 21/42203 |
| 2017/0160992 A1 | 6/2017 | Christmas |
| 2017/0371378 A1 | 12/2017 | Christmas |
| 2018/0146378 A1 | 5/2018 | Christmas |
| 2018/0375641 A1 | 12/2018 | Augustin Murguia |
| 2019/0007477 A1 | 1/2019 | Malpass |
| 2019/0012473 A1 | 1/2019 | Christmas |
| 2019/0020576 A1 | 1/2019 | Christmas |
| 2019/0037381 A1 | 1/2019 | Christmas |
| 2019/0123501 A1 | 4/2019 | Christmas |
| 2020/0010049 A1 | 1/2020 | Christmas |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 102376133 | 3/2012 |
| CN | 102591571 A | 7/2012 |
| CN | 103077462 A | 5/2013 |
| CN | 103095852 | 5/2013 |
| CN | 103546181 A | 1/2014 |

(56) References Cited

FOREIGN PATENT DOCUMENTS

| | | |
|---|---|---|
| CN | 106797337 | 5/2018 |
| CN | 105706033 | 5/2019 |
| DE | 102008023577 | 11/2009 |
| EP | 0800144 A2 | 10/1997 |
| EP | 1168769 A2 | 2/2002 |
| EP | 1761048 A2 | 3/2007 |
| EP | 1806649 A1 | 7/2007 |
| EP | 3022638 | 4/2018 |
| HK | 1242492 | 6/2018 |
| JP | 09-091155 | 4/1997 |
| JP | 2007-049606 | 2/2007 |
| JP | 2010-535351 | 11/2010 |
| JP | 2011-134159 | 7/2011 |
| JP | 2011-147136 | 7/2011 |
| JP | 2011-248489 | 12/2011 |
| JP | 2013-214801 | 10/2013 |
| JP | 6310477 | 4/2018 |
| JP | 2018-514845 | 6/2018 |
| JP | 6479026 | 2/2019 |
| KR | 10-2004-0108122 | 12/2004 |
| KR | 10-2005-0098078 | 10/2005 |
| KR | 10-20090059672 | 6/2009 |
| KR | 10-20100056594 | 5/2010 |
| KR | 10-20120092487 A | 8/2012 |
| KR | 10-2012-0059488 | 5/2013 |
| KR | 10-2017-0047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | 2005050393 | 6/2005 |
| WO | 2006107324 | 10/2006 |
| WO | 2006125027 | 11/2006 |
| WO | 2007076494 A2 | 7/2007 |
| WO | 2007103908 A2 | 9/2007 |
| WO | 2008090902 | 7/2008 |
| WO | 2009016612 | 2/2009 |
| WO | 2010018551 | 8/2010 |
| WO | 2012087847 A2 | 6/2012 |
| WO | 2014012486 | 1/2014 |
| WO | 2014016622 | 1/2014 |
| WO | 2014085502 | 6/2014 |
| WO | 2014138187 | 9/2014 |
| WO | 2014141235 | 9/2014 |
| WO | 2014151925 A1 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |
| WO | 2018144833 | 8/2018 |
| WO | 2018232186 | 12/2018 |
| WO | 2019079628 | 4/2019 |

OTHER PUBLICATIONS

USPTO; Notice of Allowance dated Aug. 28, 2019 in the U.S. Appl. No. 15/821,212.
USPTO; Restriction Requirement dated Jun. 11, 2019 in the U.S. Appl. No. 16/164,468.
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468.
PCT; International Search Report and Written Opinion dated Aug. 9, 2019 in the International Application No. PCT/US2019/027993.
USPTO; Office Action dated Oct. 8, 2015 in U.S. Appl. No. 14/092,165.
USPTO; Office Action dated Sep. 18, 2015 in U.S. Appl. No. 14/164,919.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
USPTO; Notice of Allowance dated Aug. 16, 2016 in U.S. Appl. No. 14/092,165.
USPTO; Office Action dated Oct. 6, 2016 in U.S. Appl. No. 14/197,517.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Oct. 3, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
USPTO; Notice of Allowance dated May 29, 2018 in U.S. Appl. No. 15/065,713.
USPTO; Notice of Allowance dated Jun. 20, 2018 in U.S. Appl. No. 15/435,884.

(56) References Cited

OTHER PUBLICATIONS

USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
USPTO; Final Office Action dated Oct. 18, 2018 in U.S. Appl. No. 14/197,517.
USPTO; Advisory Action dated Dec. 19, 2018 in U.S. Appl. No. 15/367,961.
USPTO; Non-Final Office Action dated Feb. 6, 2019 in U.S. Appl. No. 15/644,556.
USPTO; Final Office Action dated Feb. 7, 2019 in U.S. Appl. No. 14/795,210.
USPTO; Non-Final Office Action dated Mar. 7, 2019 in U.S. Appl. No. 15/367,961.
USPTO; Advisory Action dated Mar. 12, 2019 in U.S. Appl. No. 14/197,517.
USPTO; Notice of Allowance dated May 21, 2019 in U.S. Appl. No. 15/644,556.
USPTO; Non-Final Office Action dated May 30, 2019 in U.S. Appl. No. 16/114,531.
USPTO; Non-Final Office Action dated Jun. 14, 2019 in U.S. Appl. No. 14/197,517.
USPTO; Restriction Requirement dated Jun. 20, 2019 in U.S. Appl. No. 16/152,342.
EP; Extended Search Report dated Sep. 17, 2015 in Application Serial No. 15740208.2.
Sweden; Office Action dated Nov. 18, 2015 in Application Serial No. 1551071-2.
EP; Supplemental Search Report dated Jun. 14, 2016 in Application Serial No. 13859205.0.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 201380070041.5X [Assoc did not report OA Until Sep. 27, 2017].
CN; 2nd Examination Report dated Apr. 18, 2018 in Application Serial No. 201380070415.X.
CN; Examination Report dated May 9, 2018 in Application Serial No. 201480023946.8.
CN; 1st Office Action dated Nov. 20, 2018 in Application Serial No. 201580016416.5.
CN; 1st Office Action dated Nov. 26, 2018 in Application Serial No. 201480065117.6 (Received Jan. 25, 2019).
MX; 2nd Examination Report dated Oct. 24, 2017 in Application Serial No. 2015/011314.
MX; 3rd Examination Report dated Jul. 2, 2018 in Application No. 2015/011314 (Received on Sep. 7, 2018).
EP; Supplemental Search Report dated Sep. 15, 2017 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
TW; Notice of Allowance dated May 15, 2018 in Application Serial No. 104102514.
EP; Extended Search Report dated Apr. 9, 2018 in Application Serial No. 15848371.9.
EP; Supplementary Search Report dated Apr. 30, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Notice of Allowance dated Mar. 17, 2018 in Application Serial No. 2015-545200.
JP; Office Action dated Feb. 2, 2018 in Application Serial No. 2016-549317.
AU; 1st Office Action dated Apr. 13, 2018 in Application Serial No. 2013352236.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 in Application Serial No. MX/a/2016/003798.
CN; 3rd Examination Report dated Oct. 31, 2018 in Application Serial No. CN 201380070415.
CN; Notice of Intent to Grant dated Feb. 11, 2019 in Application No. CN 201380070415.
EPO; Examination Report dated Nov. 8, 2018 in Application No. EP 15740208.2.
AU; Examination Report dated Dec. 19, 2018 in Application Serial No. AU 2014225864.
AU; 2nd Examination Report Mar. 20, 2019 in Application No. AU 2014225864.
EP; Notice of Intent to Grant dated Jan. 4, 2019 in Application No. EP14760041.5.
CN; Notice of Intent to Grant dated Jan. 30, 2019 in Application No. CN 201480023946.8.
EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 (Received from foreign counsel on May 28, 2019) in Application No. 201480065117.6.

(56) References Cited

OTHER PUBLICATIONS

CN; Third Office Action dated Aug. 8, 2019 in Application No. 201480065117.6.
PCT; International Search Report dated Jul. 4, 2014 in Application No. US2014/020624.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 in US2014/047054.
PCT; Written Opinion dated Nov. 13, 2014 in US2014/047054.
PCT; International Preliminary Report on Patentability dated Jan. 19, 2016 in US2014/047054.
PCT; International Search Report dated Jan. 6, 2015 in US2014/058126.
PCT; Written Opinion dated Jan. 6, 2015 in US2014/058126.
PCT; International Search Report dated Mar. 5, 2014 in US2013072089.
PCT; Written Opinion dated Mar. 5, 2015 in US2013/072089.
PCT; International Preliminary Report on Patentability dated Jun. 2, 2015 in US2013/072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Nov. 2, 2015 in US2015/039797.
PCT; International Preliminary Report on Patentability dated Apr. 14, 2016 in US2014/058126.
PCT; International Search Report and Written Opinion dated Jul. 11, 2016 in US2016/021627.
PCT; International Search Report and Written Opinion dated Mar. 20, 2017 in US/2016/064744.
PCT; International Search Report and Written Opinion dated Feb. 20, 2018 in US/2017/063061 received May 31, 2018.
PCT; International Search Report and Written Opinion dated Aug. 9, 2018 in International Application PCT/US2018/016610.
PCT; International Search Report and Written Opinion dated Oct. 12, 2018 in International Application PCT/US2018/037643 (Received Dec. 20, 2018).
PCT; International Search Report and Written Opinion dated Feb. 12, 2019 in International Application PCT/US2019/056562 (Received Apr. 25, 2019).
Kim, Young-Gon, and Moon-Seog Jun. A design of user authentication system using QR oode identifying method. Computer Sciences and Convergence Information Technology (ICCIT), 6th International Conference on IEEE. Nov. 29-Dec. 1, 2011.
Application Programing Interface by David Orenstein, published Jan. 10, 2000 on Computerworld.com.
Gerd Kortuem et al., 'Architectural Issues in Supporting Ad-hoc Collaboration with Wearable Computers,' In: Proceedings of the Workshop on Software Engineering for Wearable and Pervasive Computing at the 22nd International Conference on Software Engineering, 2000.
3rd party observation dated Dec. 22, 2015 against Patent Application No. 1551071-2 in Sweden.
Revault Product Data Sheet dated Mar. 19, 2015.
Dusk Jockeys; Dust Jockyes Android Apps dated Mar. 7, 2012, pp. 1-5.
Sue White: Wi-Fi and Bluetooth Coexistence, Electronic Component News, Mar. 2, 2012, pp. 1-7, XP05504386, Retrieved from Internet: URL:https://www.ecnmag.com/article/2012/03/wi-fi-andbluetooth-coexistence [retrieved on Sep. 6, 2017].
"Class Persistent Manager," https://web.archive.org/web/20131110042918/https://tomcat.apache.org/tomcat-4.1-doc/catalina/docs/api/org/apache/catalina/session, 3 Pages, (Oct. 2018).
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
USPTO; Notice of Allowance dated Oct. 31, 2019 in the U.S. Appl. No. 16/164,468.
USPTO; Non-Final Office Action dated Dec. 20, 2019 in the U.S. Appl. No. 16/164,468.
USPTO; Notice of Allowance dated Apr. 29, 2020 in the U.S. Appl. No. 16/164,468.
USPTO; Non-Final Office Action dated Sep. 29, 2020 in the U.S. Appl. No. 16/483,004.
USPTO; Non-Final Office Action dated Nov. 5, 2020 in the U.S. Appl. No. 16/206,675.
EP; European Search Report dated Jul. 31, 2020 in the EP Application No. 18748348.2.
EP; European Extended Search Report in the EP Application No. 18748348.2 dated Nov. 4, 2020.
X Autohaux, "Keyless Entry System", Jun. 2, 2016 XP055717379 Retrieved from the Internet URL: https://images-na.ssl-images-amazon.com/images/I/91ncMVRWOSL.pdf [retrieved on Jul. 22, 2020]*the whole document* .
USPTO; Non-Final office Action dated Jul. 22, 2020 in U.S. Appl. No. 16/554,373.
USPTO; Notice of Allowance dated Dec. 16, 2020 in the U.S. Appl. No. 16/554,373.
EP; Extended Search Report dated Nov. 4, 2020 in EP 18748348.2.
PCT; International Preliminary Report on Patentability dated Oct. 29, 2020 (IPRP) in PCT Application No. PCT/US2019/027993.

* cited by examiner

DEVICE PRESENTATION WITH REAL-TIME FEEDBACK

CROSS-REFERENCE TO RELATED APPLICATIONS

This Non-Provisional patent application claims priority to U.S. Provisional Patent Application Ser. No. 62/659,022, entitled "DEVICE PRESENTATION WITH REAL-TIME FEEDBACK," and filed Apr. 17, 2018, which is incorporated herein by reference in its entirety.

FIELD

The present disclosure generally relates to a computer software system for sharing presentations and other content between computers and mobile computing devices.

BACKGROUND

In person presentations are typically displayed on a single screen using a projector so that attendees may see the presentation. Such presentations use specialized equipment which can be expensive and is often not available. Some software programs allow screens to be shared with meeting attendees. However, it may be cumbersome for attendees to login to the software programs to view the presentation. Furthermore, it may be difficult for the presenter to gauge the interest of attendees, particularly when attendees are viewing remotely over a screen-sharing program.

SUMMARY

A method may comprise transmitting, by a presenting device, presentation content to an attendee device, wherein the presenting device and the attendee device are in electronic communication; receiving, by the presenting device, sensor data from the attendee device, wherein the sensor data is captured by the attendee device in response to the presentation content being displayed on the attendee device; and displaying, by the presenting device, the sensor data on the presenting device, wherein the sensor data is displayed with the presentation content on the presenting device.

In various embodiments, the method may comprise analyzing, by the presenting device, the sensor data; generating, by the presenting device, analyzed data based on the sensor data, wherein the analyzed data is generated using sensor data processing software; and displaying, by the presenting device, the analyzed data on the presenting device, wherein the sensor data is displayed with the presentation content. The sensor data processing software may comprise at least one of a facial recognition software, a voice analysis software, or a thermal analysis software. The method may comprise displaying, by the presenting device, the analyzed data overlaid on the presentation content. The sensor data may comprise the sensor locations where an attendee is looking on the attendee device. The method may comprise generating, by the presenting device, a heatmap based on the locations; and displaying, by the presenting device, the heatmap overlaid on the presentation content. The method may comprise displaying, by the presenting device, a number of attendees currently viewing the presentation content based on the locations. The method may comprise determining, by the presenting device and based on the sensor data, a change in the number of attendees viewing the presentation content. The presentation content may be simultaneously displayed on the attendee device and the presenting device.

In various embodiments, a computer-based system may comprise a processor, and a tangible, non-transitory memory configured to communicate with the processor, the tangible, non-transitory memory having instructions stored thereon that, in response to execution by the processor, cause the processor to perform operations comprising: transmitting, by the processor, presentation content to an attendee device, wherein the computer-based system and the attendee device are in electronic communication via a network; receiving, by the processor, sensor data from the attendee device, wherein the sensor data is captured by the attendee device in response to the presentation content being displayed on the attendee device; and displaying, by the processor, the sensor data, wherein the sensor data is displayed with the presentation content.

In various embodiments, the operation of transmitting the presentation content may comprise streaming the presentation content to the attendee device via a system for peer to peer communications such as described in U.S. Pat. No. 9,584,402 entitled Systems and Methods for Peer to Peer Communication which is herein incorporated by reference in its entirety. In various other embodiment, other networks may be used. The network may be provided by a travel wireless router. The network may comprise the internet or a local area network (LAN). The sensor data may be captured by at least one of a camera, a microphone, or a thermal imaging sensor. The computer-based system may also comprise a local storage in electronic communication with the processor, wherein the local storage is configured to store the presentation content. The computer-based system may also comprise a portable storage device in electronic communication with the processor, wherein the portable storage device is configured to store the presentation content. The portable storage device may be configured to communicate wirelessly via the network to the attendee device and the computer-based system.

In various embodiments, a method may comprise discovering, by a computer-based system, an attendee device in electronic communication with a network, wherein the network is a local area network (LAN); transmitting, by the computer-based system, an invitation to the attendee device to view presentation content; transmitting, by the computer-based system, the presentation content to the attendee device in response to the attendee device accepting the invitation, wherein the presentation content comprises a presentation and an engagement feedback tool; and displaying, by the computer-based system, the presentation content, wherein in response to the presentation content being displayed, the presentation content is displayed on the attendee device.

In various embodiments, the invitation may comprise an authentication control. The engagement feedback tool may comprise at least one of a live poll, a question and answer feature, a chat feature, a contact information exchange feature, a screen sharing feature, or a hand raising functionality.

BRIEF DESCRIPTION OF THE DRAWINGS

A more complete understanding may be derived by referring to the detailed description and claims when considered in connection with the Figures, wherein like reference numbers refer to similar elements throughout the Figures.

DETAILED DESCRIPTION

Figure 1:
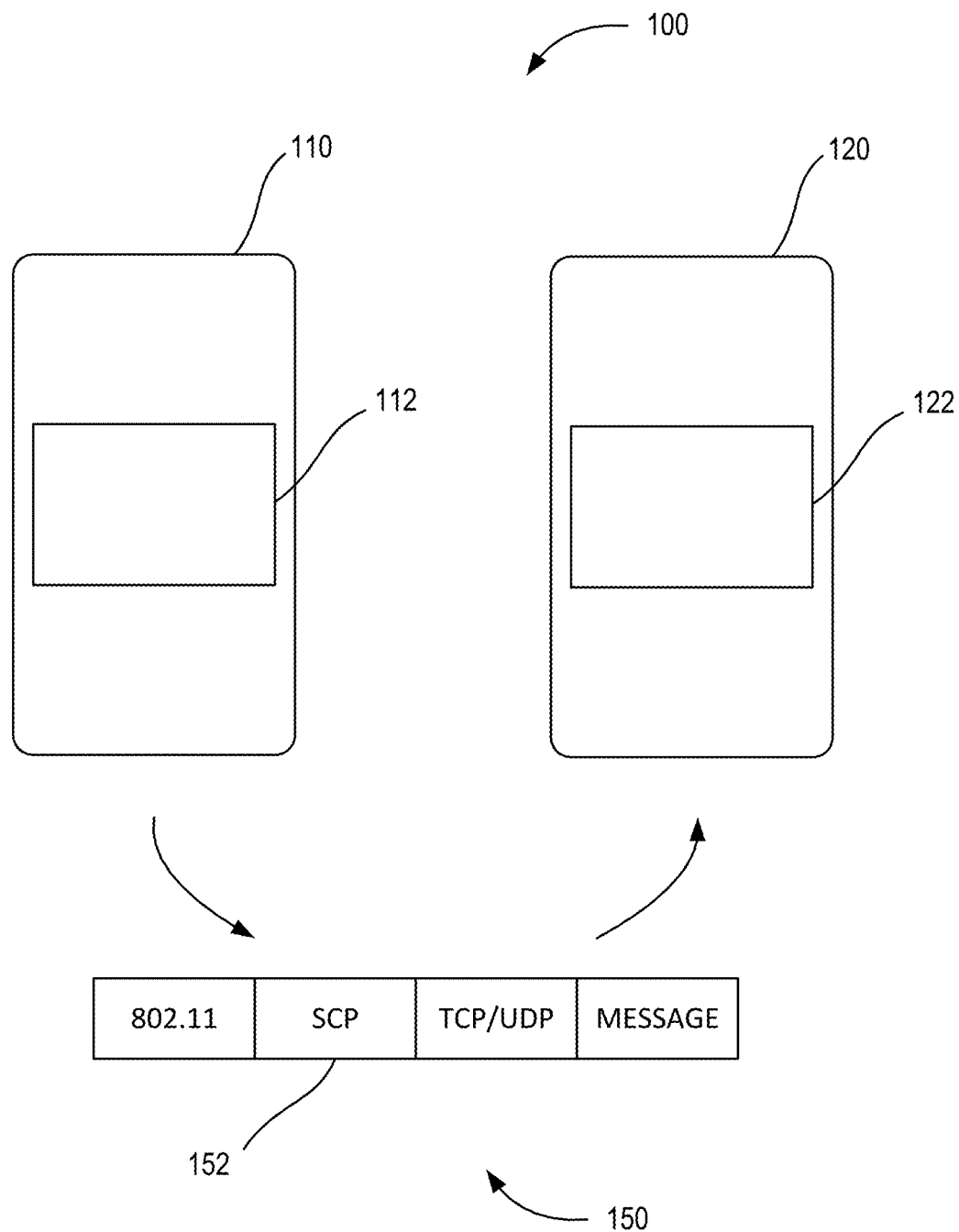
FIG. 1 illustrates a schematic diagram of a system for transmitting messages according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure relates to systems, methods, and computer program products. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. After reading the description, it will be apparent to one skilled in the relevant art(s) how to implement the disclosure in alternative embodiments.

Systems and methods are disclosed herein for providing real-time feedback during a presentation. A presenting device may share content with one or more attendee devices. The attendee devices may comprise sensors which collect data from the attendees, such as where the eyes of the attendees are looking. The sensor data may by analyzed, and the presenting device may display the analyzed data to the presenter.

The systems and methods disclosed herein may enable communication between devices without connection to the Internet or other networks using a standardized communication system ("SCS"). An SCS may be operable on the computing devices of the present disclosure. The SCS may comprise any combination of hardware and/or software. The SCS may utilize existing physical components of the device, such as 802.11 or 802.2(2) wireless chips and Bluetooth® systems in order to communicate with other devices. The SCS may be suitable for any communication protocol, such as IP, TCP/UDP, Bluetooth®, raw Manchester encoding, and any other form of wireless communication.

Referring to FIG. 1, a system 100 for transmitting content is illustrated according to various embodiments. A first device 110 comprising an SCS 112 and a second device 120 comprising an SCS 122 are illustrated according to various embodiments. In various embodiments, SCS 112 and SCS 122 may be aftermarket software programs installed on first device 110 and second device 120. For example, a user may download an SCS app onto a smartphone or other device. However, in various embodiments, SCS 112 and SCS 122 may be embedded into a chip, such as an 802.11 wireless chip, in first device 110 and/or second device 120.

In various embodiments, the SCS may implement a standardized communication protocol ("SCP") on a device. The SCP may attach an SCP header 152 to a packet in order to identify a datagram 150 as an SCP datagram. First device 110 may communicate with second device 120 via SCP. The SCS may recognize the SCP header and may follow the SCP. The SCP may define the ability for devices to discover one another, to request the transfer of raw data, to transmit confirmations on receipt of data, and to perform any other steps involved with transmitting data.

In various embodiments, the SCS may be implemented at the network layer in the Open Systems Interconnection ("OSI") model (or the Internet layer in the TCP/IP model). Regardless of the protocol being used at the transport layer (e.g. TCP, UDP, SCTP, DCCP), the SCP header may allow devices comprising an SCS to communicate via SCP.

In various embodiments, at least one of first device 110 and second device 120 may comprise a smartphone. However, in various embodiments, first device 110 and second device 120 may comprise any type of device capable of transmitting and/or receiving data.

Figure 2:
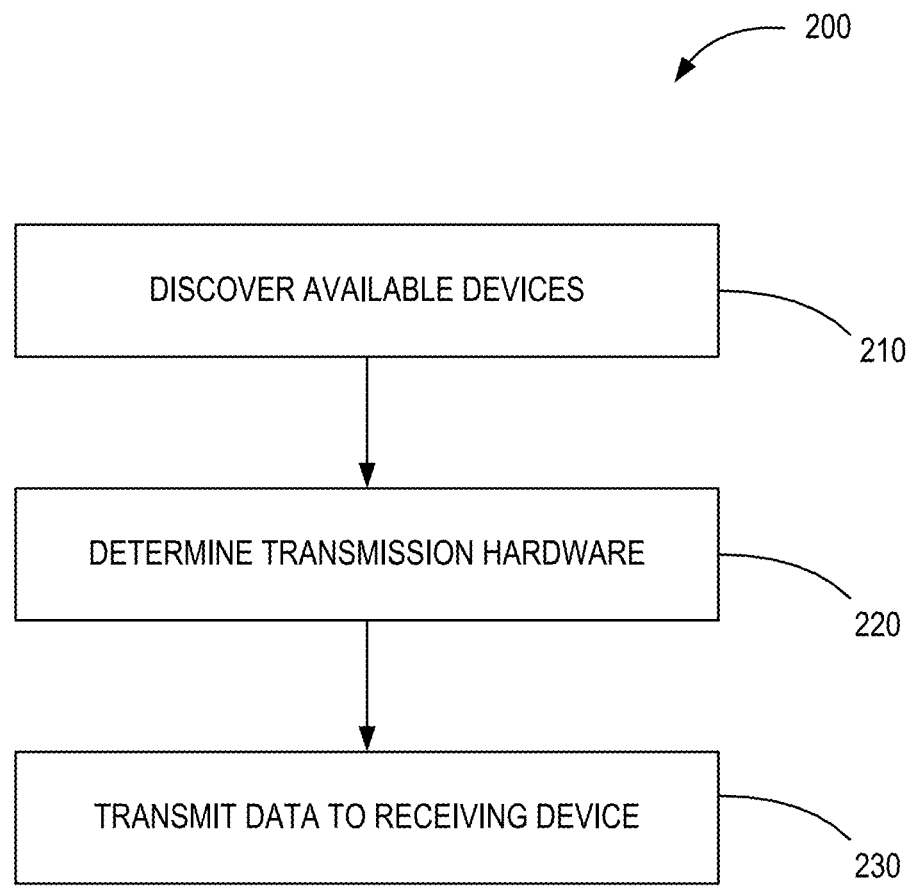
FIG. 2 illustrates a process for transmitting data between devices according to various embodiments.

Referring to FIG. 2, a process 200 for transmitting data between devices is illustrated according to various embodiments. In various embodiments, a first user may wish to transmit data from first device 110 to second device 120. The data may comprise any type of data, such as a text message, image, video, text document, or any other type of file.

First device 110 may discover available devices (step 210). First device 110 may attempt to discover other devices by a variety of methods. In various embodiments, first device 110 may discover other devices via a camera or other optical device. In various embodiments, second device 120 may display a symbol, such as a QR-code, a barcode, or text. The symbol may comprise identifying characteristics about second device 120. For example, in various embodiments the identifying characteristics may comprise at least one of a device name, an IP address of the device, an owner name, an endpoint of the device, and the available transport layers on the device. First device 110 may scan the symbol using a camera. First device 110 may obtain the identifying characteristics from the symbol and use the identifying characteristics in order to transmit data to second device 120.

In various embodiments, the SCS on first device 110 may search for other devices using a wireless chip in first device 110. Devices comprising an SCS may transmit a broadcast message. The broadcast message may comprise the identifying characteristics of the device. In various embodiments, first device 110 may be within transmission range of second device 120. The transmission range may depend on the specific type of wireless chips in first device 110 and second device 120. However, in various embodiments, the transmission range may be up to about 200 feet-300 feet. The SCS may open a socket on first device 110 to listen for broadcast messages. The broadcast message may be sent by a variety of hardware. For example, the broadcast message may be transmitted via an 802.11 wireless chip, Bluetooth® chip, or NFC.

In various embodiments, first device 110 and second device 120 may not be within transmission range of each other. However, an intermediary device, such as a smartphone equipped with hotspot technology, may be within transmission range of first device 110. First device 110 may search for available devices by transmitting a message to intermediary device, instructing intermediary device to look for available devices. Intermediary device may receive a broadcast message from second device 120, and intermediary device may transmit the broadcast message to first device 110. Thus, first device 110 may discover second device 120 without connecting to the internet or a cellular network even though first device 110 may not be within transmission range of second device 120. In various embodiments, any number of intermediary devices may be daisy-chained, such that first device 110 may discover second device 120 from miles apart by transmitting data via a series of intermediary devices.

First device 110 may display a list of all discovered devices to the user. The user may select second device 120 in order to transmit data to second device 120. The user may select a file or message to be transmitted to second device 120.

The SCS 112 on first device 110 may determine the transmission hardware to utilize for the transmission (step 220). In various embodiments, first device 110 and second device 120 may each have only one type of transmission hardware, such as an 802.11 wireless chip, and the SCS 112 may thus select the 802.11 wireless chip to transmit the data. However, in various embodiments, multiple transmission paths may be available between first device 110 and second device 120. For example, first device 110 and second device 120 may each comprise an 802.11 wireless chip and a Bluetooth® chip. In various embodiments, the SCS 112 may determine the fastest transmission path, and may select the fastest transmission path to transmit the data. In various embodiments, the transmission path may be selected by default settings. For example, SCS 112 may always select an 802.11 wireless path for transmission when available, and if the 802.11 wireless path is not available, SCS 112 may select a Bluetooth® path. However, in various embodiments, the SCS 112 on first device 110 may transmit a speed test message to second device 120 via each available transmission path, and the SCS 112 may select the fastest transmission path based on the speed test results.

In various embodiments, the SCS 112 may instruct first device 110 to send the data to second device 120 via multiple transmission paths. A message may be divided into multiple packets. SCS 112 may analyze the available transmissions paths and send the message over multiple transmission paths in order to expedite transmission of the entire message. For example, SCS 112 may determine that the fastest method of transmitting the message may be to transmit 90% of the packets via an 802.11 wireless path, and 10% of the packets over a Bluetooth® path. SCS 112 may attach an SCP header to each packet being transmitted to second device 120, whether via 802.11 wireless or Bluetooth®. Thus, SCS 122 on second device 120 may recognize the packets as being received by SCP, and SCS 122 may reassemble the packets in order to recreate the entire message. In various embodiments, SCS 112 may analyze all transmission paths available, including but not limited to multiple 802.11 wireless chips, Bluetooth® chips, NFC, PDQ, or any other transmission paths in order to select the fastest transmission method. The SCS on first device 110 may initiate a file send protocol and transmit the data to second device 120 (step 230).

In various embodiments, first device 110 and second device 120 may be connected to the same local network. First device 110 may transmit a link, such as a QR-code, over a cellular network or the local network to second device 120. In various embodiments, the link may comprise 10 kb or less of data. Second device 120 may use the link to request or accept a file transfer. First device 110 may transmit a file over the local network. In various embodiments, the file may be transferred using TCP/IP directly over the local network.

In various embodiments, second device 120 may have access to an internet connection. First device 110 may transmit a link over a cellular transmission path to second device 120, and second device 120 may use the link to download a file stored on the cloud and/or on a server over the internet. In various embodiments, second device 120 may download the file using TCP/IP.

In various embodiments, first device 110 may sync its contents with a cloud database. In various embodiments, first device 110 may comprise an SCS folder, and only files stored in the SCS folder may be synced with the database. First device 110 may transmit a link over a cellular transmission path to second device 120 identifying a file stored on the database. In various embodiments, second device 120 may not have access to an 802.11 wireless network at the time second device 120 receives the link. Second device 120 may use the link to access the file whenever second device 120 gains access to an 802.11 wireless network in order to prevent cellular data charges. In various embodiments, second device 120 may use the link to access the file over the cellular network. In various embodiments, second device 120 may stream all or part of the file over either the cellular network or an 802.11 wireless network.

In various embodiments, first device 110 may share an online folder with second device 120. First device 110 may indicate that second device 120 may have access to an online folder. First device 110 may sync with the online folder to upload files stored on first device 110 to the online folder. Second device 120 may sync with the online folder to download files stored in the online folder to second device 120.

Figure 3:
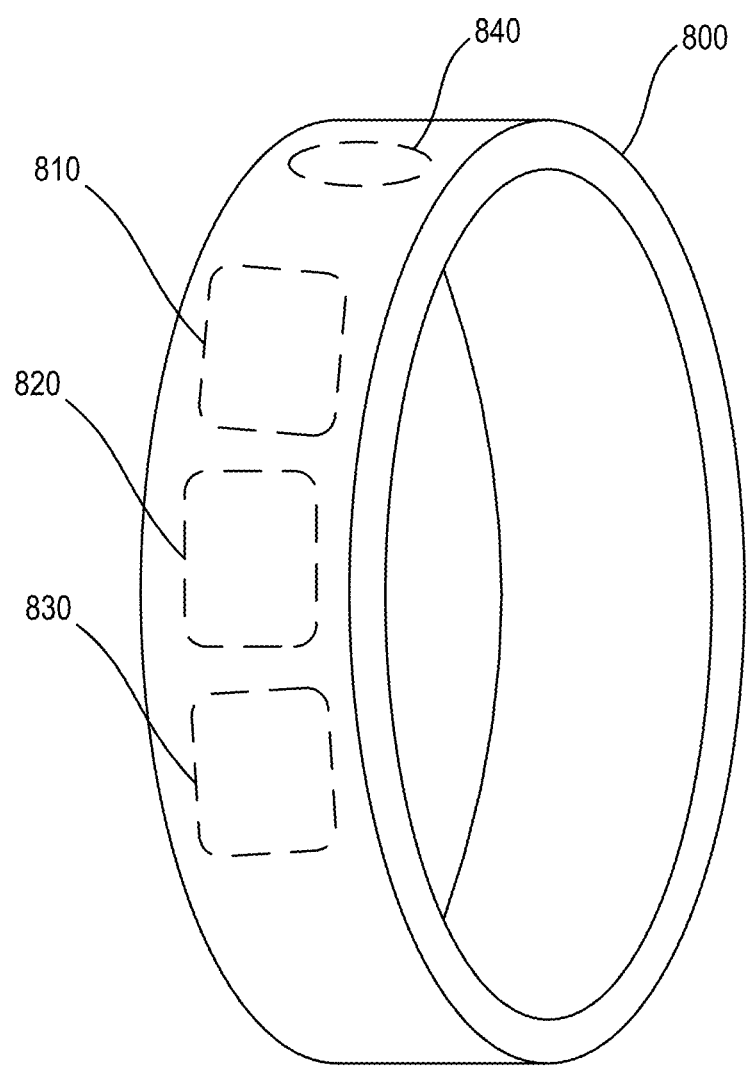
FIG. 3 illustrates a portable storage device according to various embodiments.

Referring to FIG. 3, a portable storage device ("PSD") 800 is illustrated according to various embodiments. The PSD 800 may be a wearable device, such as a wrist band or bracelet. However, PSDs may be any type of portable device which is capable of storing information. For example, a PSD may comprise a watch, necklace, phone case, smartphone, implanted chips, clothing item, wallet, etc.

The PSD 800 may comprise a storage module 810, a communication module 820, a processor 830, and a battery

840. The storage module 810 may comprise a memory card. For example, the storage module 810 may comprise an SD card, an xD card, a CompactFlash card, or any other suitable memory card. The storage module 810 may comprise an internal memory, such as iSSD, SSD, iNAND, or flash SD. The communication module 820 may comprise one or more components capable of wireless communication. For example, the communication module may comprise an 802.11 or 802.2(2) wireless chip, a Bluetooth® chip, an NFC chip, etc. The processor 830 may comprise any combination of hardware and/or software capable of providing instructions to the storage module 810 and the communication module 820. In various embodiments, the storage module 810, the communication module 820, and the processor 830 may be embedded within the PSD 800, such that the PSD 800 does not have any visible electronic components. In various embodiments, the PSD 800 may comprise a waterproof coating, such as rubber or silicone.

The PSD 800 may comprise a standard communication system ("SCS") as previously described herein. The SCS may be any combination of hardware and/or software which is capable of communicating via a standard communication protocol ("SCP") as previously described herein. In various embodiments, the SCS may be implemented on at least one of the storage module 810, the communication module 820, or the processor 830.

The PSD 800 may wirelessly receive and transmit files and communications from other devices, such as smartphones, televisions, game consoles, tablets, personal computers, printers, etc. Due to the SCS, the PSD 800 may not be limited to communicating with any particular brand or manufacturer of device. In contrast, the PSD 800 may communicate across platforms, such as with Apple® devices, Android® devices, Windows® devices, UNIX® devices, or any other suitable devices.

In various embodiments, the PSD 800 may allow a user to access their files wherever the user goes. For example, a user may have a document stored on a laptop computer. The user may transmit the document from the laptop computer to the PSD 800 using the SCS. The PSD 800 may store the document in the storage module 810. The user may then transmit the document from the PSD 800 to another device, such as a smartphone, using the SCS.

In various embodiments, the PSD 800 may communicate directly with other devices without using a network. Thus, information may be transmitted securely between the PSD 800 and other devices. However, in various embodiments, the PSD 800 may communicate over a network using a wireless chip in the communication module 820. The communication module 820 may comprise two wireless chips, allowing the PSD 800 to simultaneously communicate over a network on a first wireless chip and directly to another device on a second wireless chip.

In various embodiments, the PSD 800 may allow data to be transferred from a device to the PSD 800 without storing the data on the device. For example, a smartphone may capture a picture and transmit the picture directly to the PSD 800 using the smartphone's RAM without storing the picture on the hard drive of the smartphone. Thus, the smartphone may be lost, stolen, sold, or donated without risk of a third-party obtaining the picture, or other data which is stored on the PSD 800 and not the smartphone. Similarly, a user may initiate an SCS on a device, such as a laptop, and open a file stored on the PSD 800 using the device. The user may edit the file on the device and save the edited file directly on the PSD 800 without saving the edited file on the device.

A user may use the PSD 800 to store all of the user's files. Regardless of what device a user is using to access the files on the PSD 800, the user may create, edit, and delete files directly on the PSD 800 using another device, such as a personal computer.

In various embodiments, the PSD 800 may emulate a network drive. Thus, the PSD 800 may be able to communicate with devices which are not capable of downloading or installing custom software. For example, the PSD 800 may emulate a DLNA media service, or a Windows® network. The PSD 800 may require a password to be entered on the device, and the device may then access files stored on the PSD 800.

Figure 4:
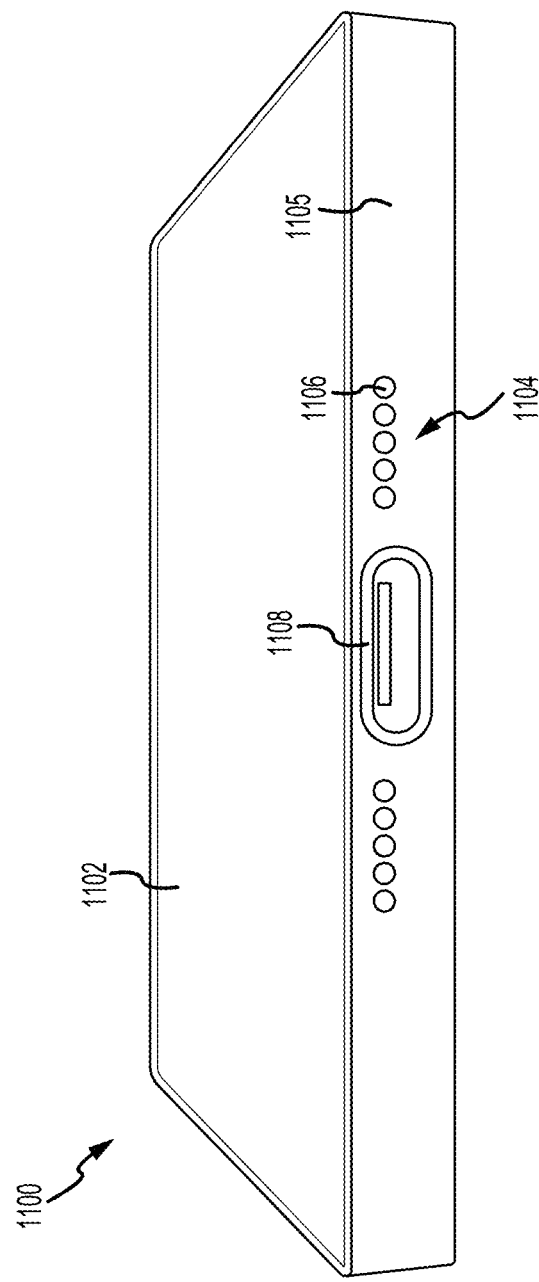
FIG. 4 illustrates a portable storage device suitable for electronic and mechanical coupling to various components in a modular portable storage system according to various embodiments.

Referring to FIG. 4, a portable storage device 1100 for use with modular components is shown, in accordance with various embodiments. Portable storage device 1100 may include features and functionality described herein. Portable storage device 1100 may have a housing 1102. Housing 1102 may be made from materials including metals, plastics, and/or rubbers. For example, housing 1102 may be made from stamped and fused sheets of aluminum, molded plastic, or other suitable materials. Housing 1102 may also be made from thermally conductive materials to enhance heat dissipation.

In various embodiments, electronic interface panel 1104 may further comprise a data port 1108 exposed from housing 1102. Data port 1108 may be configured to transmit power and/or signals over electronic connections in a predetermined format. For example, data port 1108 may use a protocol such as USB, firewire, lightning cable, SATA, PCIe, or other suitable cable interface for data and/or power transfer. Data port 108 may also use a proprietary pin configuration and slot geometry.

Figure 5A:
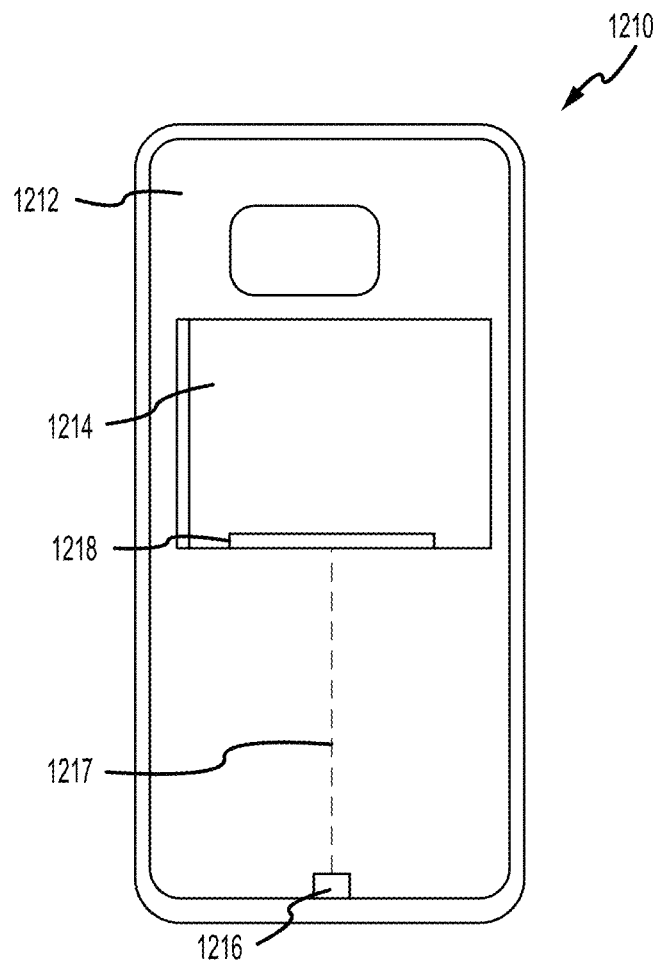
FIGS. 5A, 5B, and 5C illustrate a case for use with a modular storage device according to various embodiments.
Figure 5B:
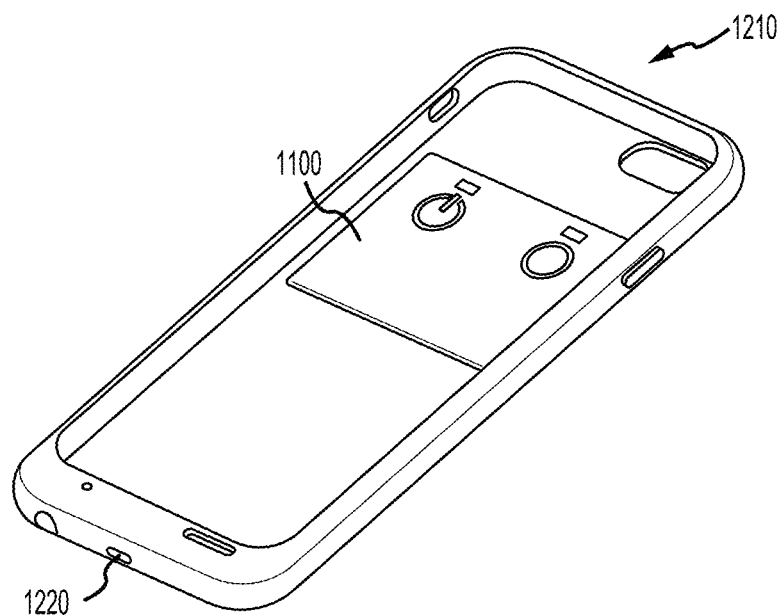
Figure 5C:
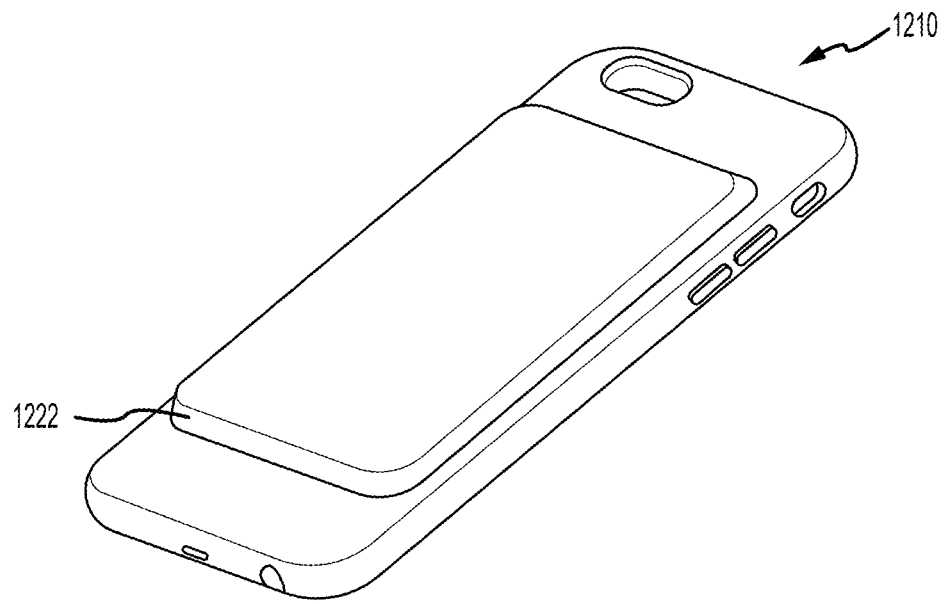

Referring to FIG. 5A-5C, a case 1212 for a mobile computing device is shown as a portable storage assembly 1210, in accordance with various embodiments. Case 1212 may fit on a portable computing device such as, for example, a tablet, smartphone, smart watch, laptop, or other suitable computing device. Case 1212 may have an interior contour matching that of a computing device to retain the computing device. Case 1212 may define cavity 1214 with a shape suitable to receive and retain with portable storage device 1100. In that regard, portable storage device 1100 may be removably coupled to case 1212, and cavity 1214 may have a geometry mirroring 5 sides of the portable storage device with an opening shaped like a surface of the portable storage device. The cavity may thus be defined by five orthogonal surfaces. The portable storage device may lie with a surface flush with the interior of case 1212.

In various embodiments, case 1212 may include interface 1218 suitable for communication with data port 1008 or conductive pads 1106 (of FIG. 4). Interface 1218 may by electronically coupled to a data plug 1216 by an electrical conduit 1217 such as a wire. Data plug 1216 may interface with a corresponding data port on a computing device retained within case 1212. Data plug 1216 may thus plug into the bottom port on a smartphone to electrically couple case 1212 to the smartphone, for example. Case 1212 may further include a protrusion 1222 configured to house the PCBs and power supplies described herein as well as the cavity 1214.

Figure 6:
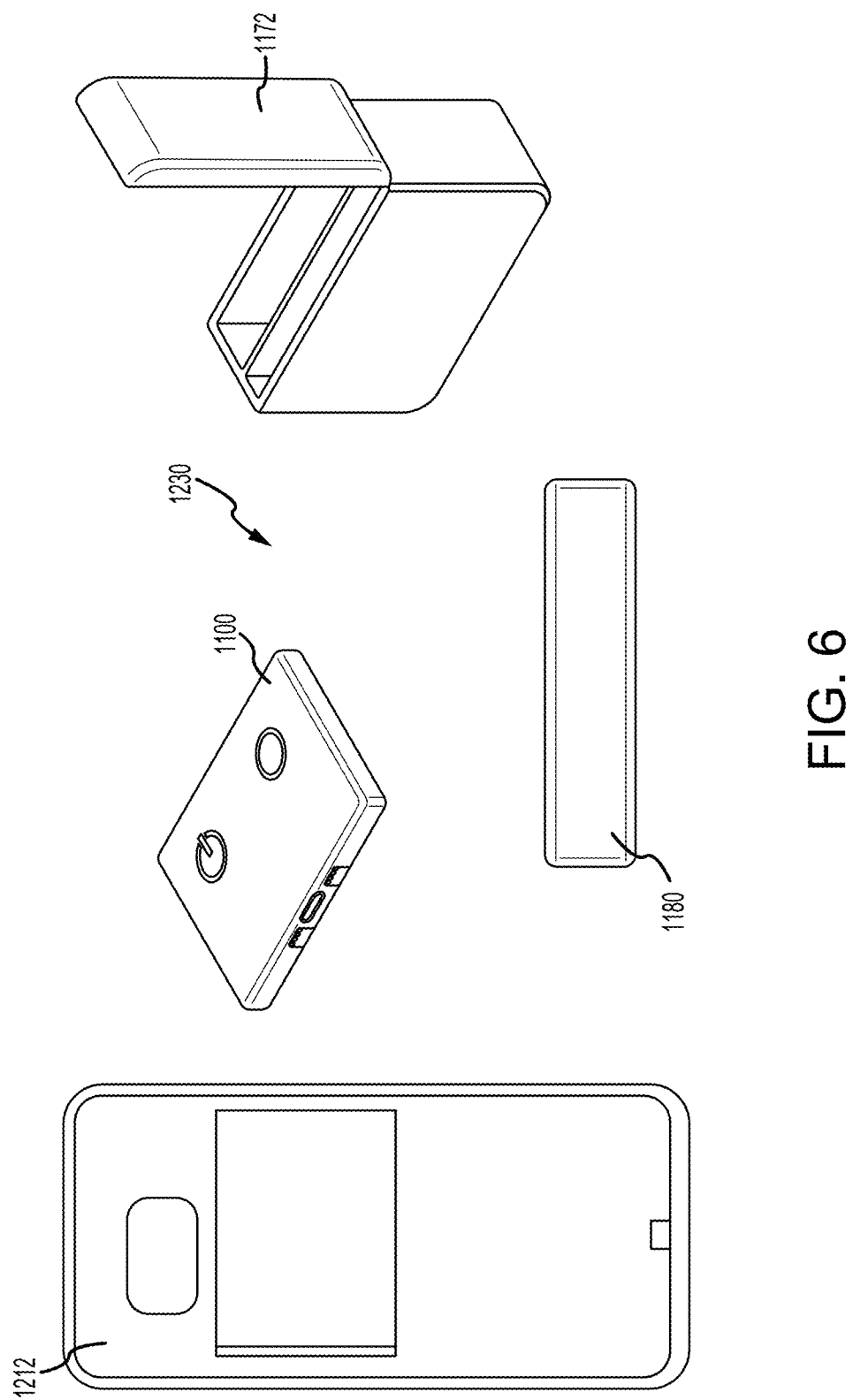
FIG. 6 illustrates a modular portable storage system having a case, an external housing, a portable storage device, and a power supply reconfigurable into various storage arrangements according to various embodiments.

In various embodiments, case 1212 may enable physical electronic communication between portable storage device 1100, a power supply (e.g., power supply 1180 as shown in FIG. 6), a PCB, or other electronic devices retained within case 1212. Case 1212 may further enable electronic communication of power and/or data to and/or from the mobile device retained within case 1212. Portable storage device 1100 may also be in wireless communication with the mobile device retained within case 1212 as described herein.

Referring to FIG. 6, a modular portable storage system 1230 is shown, in accordance with various embodiments. Modular portable storage system 1230 may include case 1212, portable storage device 1100, power supply 1180, and/or external housing 1172. In various embodiments, the portable storage device 1100 may be inserted within the external housing 1172. The power supply 1180 may also be inserted within external housing 1172 to power the portable storage device 1100. The various components described herein may be removable and interchangeably coupled to one another electronically and mechanically. In that regard, portable storage device 1100 may be utilized in various configurations to augment functionality of computing devices in communication with portable storage device 1100. For further description of portable storage devices and their communication abilities, see U.S. Ser. No. 15/644,556 titled "PORTABLE STORAGE DEVICE WITH MODULAR POWER AND HOUSING SYSTEM," and filed on Jul. 7, 2017, U.S. Ser. No. 14/164,919 titled "SYSTEMS AND METHODS FOR PEER TO PEER COMMUNICATION" and filed on Jan. 27, 2014, and U.S. Ser. No. 14/745,100 titled "SYSTEMS AND METHODS FOR PORTABLE STORAGE DEVICES," and filed on Jun. 19, 2015 the contents of all of which are incorporated by reference herein in their entirety.

Figure 7A:
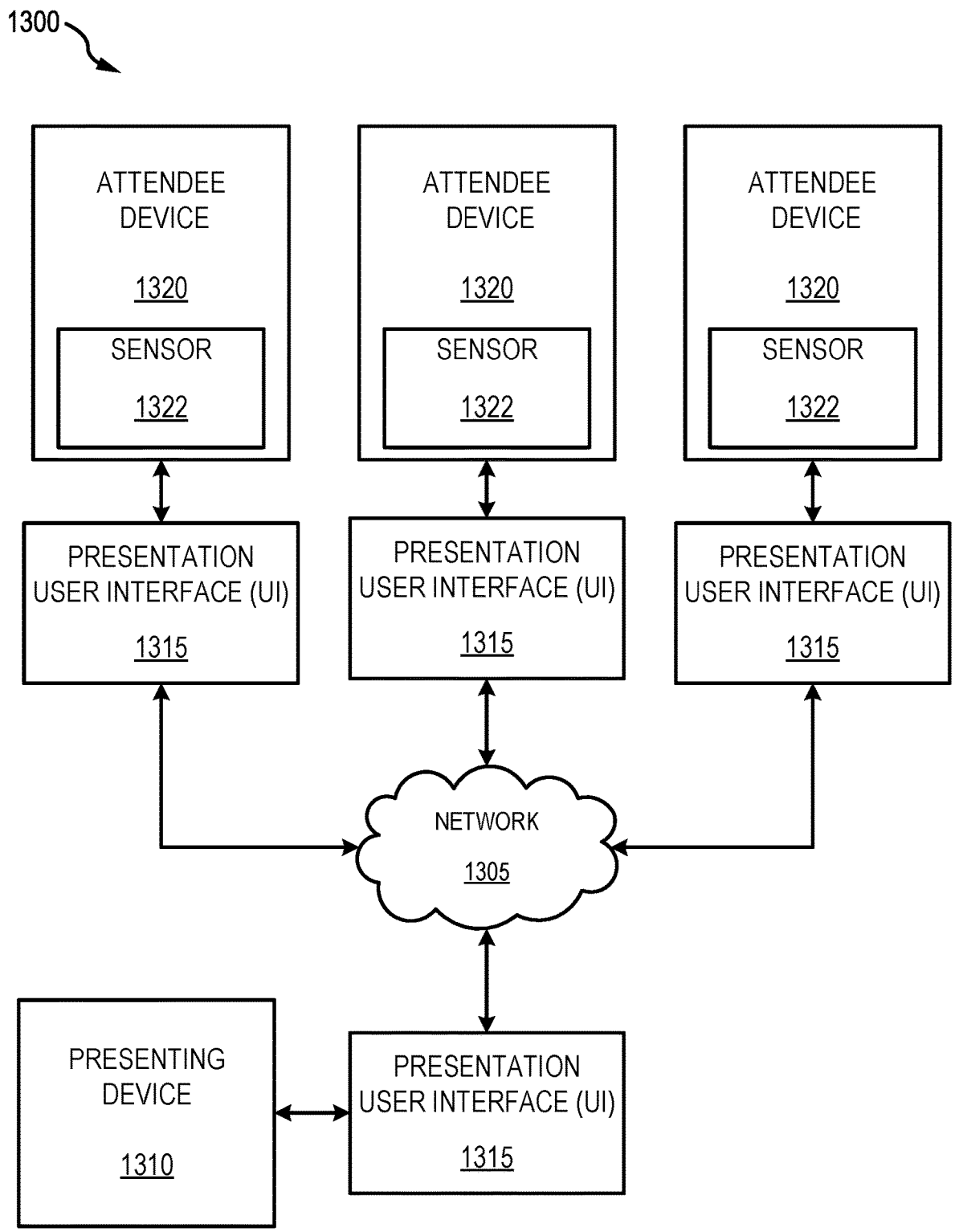
FIGS. 7A and 7B illustrate systems for presenting content according to various embodiments.

Referring to FIG. 7A, and in accordance with various embodiments, a system 1300 for presenting content is disclosed. System 1300 may be configured to connect presenters and attendees to enable the presenter to present content to the various attendees. System 1300 may also enable the attendees to interact with the presenter through various engagement feedback tool including, for example, live polls, direct questions, discrete question and answers, downloading the presented content, screensharing, exchange of contact information, and/or the like.

In various embodiments, system 1300 may allow the presenter and/or the attendees to use any suitable computing device (having any suitable operating system) to present and view the presented content, including, for example, a smartphone, laptop, desktop computer, internet of things (IoT) device, and/or any other suitable computing device having network communication capabilities. The presented content may be transmitted to the attendees without requiring the use of additional software, mobile application, or the like. System 1300 may allow the presenter to connect with the attendees over any suitable network that the devices are connected to (e.g., the internet, a local area network (LAN), a wide area network (WAN), a portable travel network router, etc.). In that regard, system 1300 may be configured to allow the presenter to present content to any desired number of attendees, dependent on the strength and capabilities of the network, and without requiring the use of the internet. In various embodiments, system 1300 may also enable the presenter to receive feedback from one or more attendees, either through active feedback or passive feedback, as discussed further herein.

System 1300 may comprise a presenting device 1310 and one or more attendee devices 1320. Presenting device 1310 and attendee devices 1320 may be in electronic communication via a system as described in U.S. Pat. No. 9,584,402 or other networks such as a network 1305. Network 1305 may comprise any suitable network discussed herein, including, for example, the internet, a local area network (LAN), a wide area network (WAN), or the like.

In various embodiments, a user (e.g., a presenter) may interface with presenting device 1310 to present content to one or more attendee devices 1320. Presenting device 1310 may include any device which communicates, in any manner discussed herein, with attendee devices 1320, via network 1305 or any other network or protocol discussed herein. For example, presenting device 1310 may comprise a computing device such as a server, laptop, notebook, hand held computer, cellular phone, smart phone (e.g., IPHONE®, BLACKBERRY®, ANDROID®, etc.), tablet, wearable (e.g., smart watches, smart glasses, smart rings, etc.), internet of things (IoT) device, or any other similar device. Presenting device 1310 may comprise software configured to aid presenting device 1310 in interacting with system 1300, such as, for example, an internet browser (e.g., MICROSOFT INTERNET EXPLORER®, GOOGLE CHROME®, etc.), mobile application, or the like. Practitioners will appreciate that presenting device 1310 may or may not be in direct electronic communication with network 1305. For example, presenting device 1310 may access the network 1305 through another server or network, which may have a direct or indirect connection to an internet server. Practitioners will further recognize that presenting device 1310 may present interfaces associated with a software application or module that are provided to presenting device 1310 via application graphical user interfaces (GUIs) or other interfaces and are not necessarily associated with or dependent upon internet browsers or internet specific protocols.

For example, and in accordance with various embodiments, presenting device 1310 may display or be in communication with a presentation user interface (UI) 1315. Presentation UI 1315 may be configured to enable the user to view, select, transfer, and/or otherwise interact with the presented content. In various embodiments, presentation UI 1315 may comprise a split-screen, or multi-screen, experience to enable the user to view the presented content, presentation notes, questions, attendee feedback, or the like at the same time. For example, presentation UI 1315 may allow the user to toggle between different screens or select one or more screens to display content at a single time.

Figure 7B:
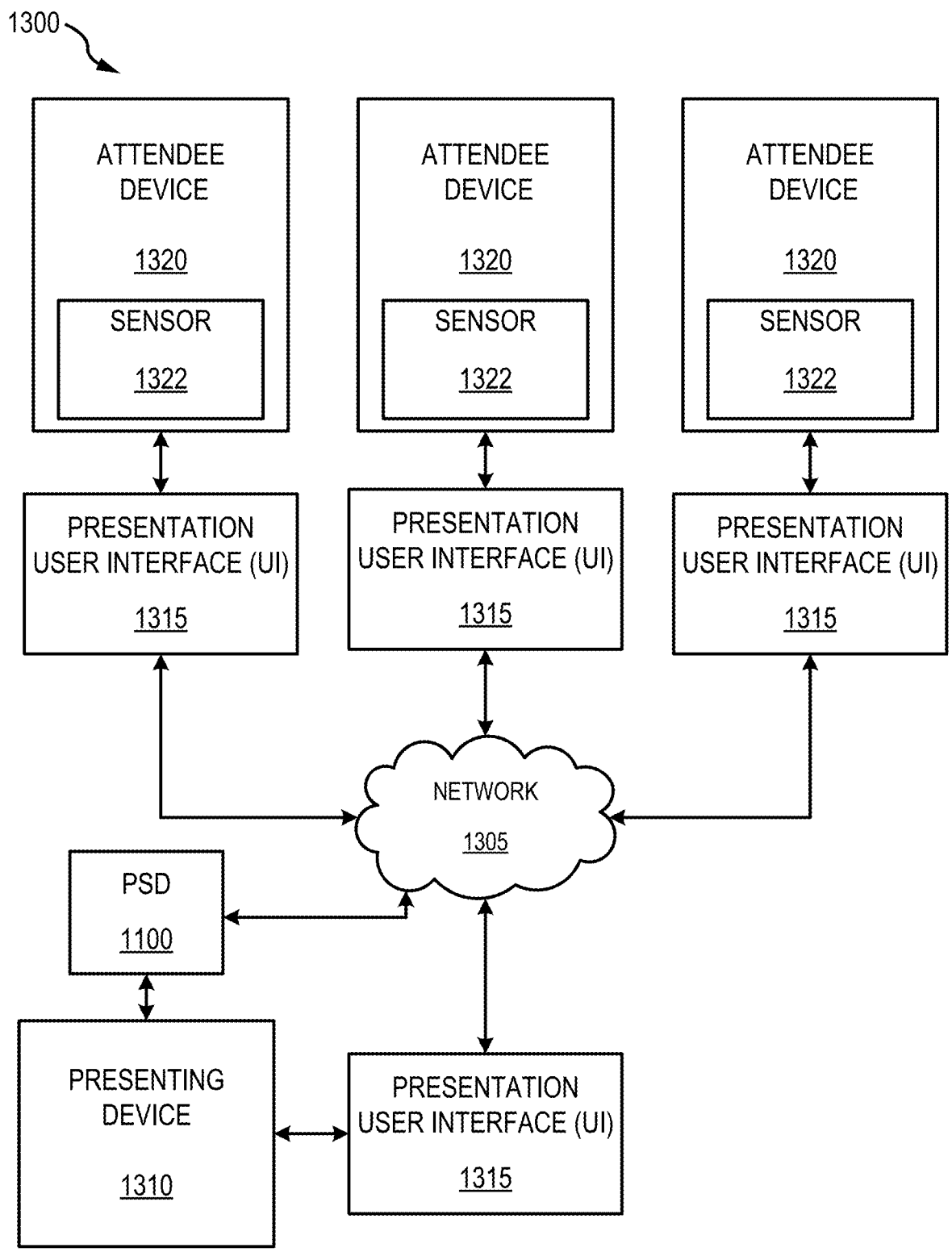

In various embodiments, the content may be a file, or a plurality of files, stored locally on presenting device 1310. In various embodiments, and with reference to FIG. 7B the content may be stored on a separate storage device, such as portable storage device 1100 (e.g., as described in FIG. 4), which may be separate from, electronically connected, or physically connected to presenting device 1310. In various embodiments, portable storage device 1100 may be configured to directly transmit the content to one or more attendee devices 1320. In that respect, portable storage device 1100 may be in electronic communication with network 1305. In various embodiments, the content may be located on a remote server or cloud computing system, and presenting device 1310 may access the content using a URL, file system, or other method. The content may be stored in temporary memory on the presenting device 1310 or portable storage device 1100. For further information on streaming content between devices, see U.S. Ser. No. 15/821,212 titled "SYSTEMS AND METHODS FOR STREAMING MEDIA," and filed on Nov. 22, 2017, the contents of which are incorporated by reference herein in their entirety. In yet other embodiments, devices such as disclosed in U.S. Pat. No. 10,123,153 entitled Systems and Methods for Portable Storage Devices, the contents of which are herein incorporated by reference in their entirety may be used in accordance with various embodiments of the present invention.

With reference again to FIG. 7A, and in accordance with various embodiments, one or more second users (e.g., attendees) may interface with attendee device 1320 to view content presented by presenting device 1310. Attendee device 1320 may include any device which communicates, in any manner discussed herein, with presenting device 1310, via network 1305 or any other network or protocol discussed herein. For example, attendee device 1320 may comprise a computing device such as a server, laptop, notebook, hand held computer, cellular phone, smart phone (e.g., IPHONE®, BLACKBERRY®, ANDROID®, etc.), tablet, wearable (e.g., smart watches, smart glasses, smart rings, etc.), internet of things (IoT) device, or any other similar device. Attendee device 1320 may comprise software configured to aid attendee device 1320 in interacting with system 1300, such as, for example, an internet browser (e.g., MICROSOFT INTERNET EXPLORER®, GOOGLE CHROME®, etc.), mobile application, or the like. Practitioners will appreciate that attendee device 1320 may or may not be in direct electronic communication with network 1305. For example, attendee device 1320 may access the network 1305 through another server or network, which may have a direct or indirect connection to an internet server. Practitioners will further recognize that attendee device 1320 may present interfaces associated with a software application or module that are provided to attendee device 1320 via application graphical user interfaces (GUIs) or other interfaces and are not necessarily associated with or dependent upon internet browsers or internet specific protocols.

For example, and in accordance with various embodiments, attendee device 1320 may display or be in communication with a presentation user interface (UI) 1315. Presentation UI 1315 may be configured to enable the second user to view and otherwise interact with the presented content. In various embodiments, presentation UI 1315 may comprise a split-screen, or multi-screen, experience to enable the second user to view the presented content and provide active feedback (e.g., via a poll, question or chat interface, etc.), or the like at the same time. For example, presentation UI 1315 may allow the second user to toggle between different screens or select one or more screens to display content at a single time.

Presenting device 1310 may transmit an invitation to attendee devices 1320 to view the content. One or more of the attendee devices 1320 may be located in close proximity to presenting device 1310, such as in the same room. However, one or more of attendee devices 1320 may be located remotely, such as in a different room, building, city, state, or country. In various embodiments, the invitation may comprise a link, a URL, or the like, and the invitation may be transmitted via email, SMS, push notification, verbally transmitted, etc. In various embodiments, and with reference again to FIG. 7B, portable storage device 1100 and/or presenting device 1310 may discover one or more attendee devices 1320, and the user may select the attendee devices 1320 from a list provided by portable storage device 1100 and/or presenting device 1310. The attendees may accept the invitation in order to view the content. In various embodiments, the invitation may comprise (and be protected by) an authentication control, such as, for example, a user name and password, a unique passphrase, and/or the like.

Presenting device 1310, attendee devices 1320, and/or portable storage device 1100 may communicate using any equipment and protocols known in the art. For example, the various components may communicate over the internet, using wireless chips, via cellular towers, via satellite communications, etc.

Presenting device 1310 may transmit the content to attendee devices 1320. In various embodiments, the content may be transmitted directly, via network 1305, via portable storage device 1100, and/or through any other suitable transmission method. The content may be streamed to attendee devices 1320. For example, the content may comprise a MICROSOFT POWERPOINT®, APPLE KEYNOTE®, or PREZI® presentation, and as the user changes slides on presenting device 1310 (e.g., via presentation UI 1315), attendee devices 1320 (e.g., via presentation UI 1315) may show the slides as they change. The content may comprise any suitable or desired static or dynamic content.

In various embodiments, attendee devices 1320 may comprise one or more sensors 1322. For example, sensors 1322 may comprise one or more cameras, microphones, thermal imaging sensors, accelerometers, compasses, etc. The sensors 1322 may be configured to detect actions of the attendees, capture feedback from the attendees, and/or the like. In various embodiments, the sensors 1322 may comprise a camera which captures still images or video of attendees. The sensors 1322 may comprise a microphone which detects audio, such as words, tones, or sounds. The sensors 1322 may comprise a thermal imaging (e.g., infrared) sensor which detects the number and/or locations of persons in view of the sensor.

In various embodiments, one or more of presenting device 1310, attendee devices 1320, or portable storage device 1100 may comprise sensor data processing software. The sensor data processing software may be configured to analyze the data captured by the sensors 1322 and present the data to the presenter. The analyzed data may be presented to the presenter using any suitable technique. For example, the analyzed data may be presented to the presenter in real time via presentation UI 1315. The analyzed data may also be presented in a generated report and transmitted via email, SMS, or the like.

In various embodiments, the sensor data processing software may comprise facial recognition software. The facial recognition software may be configured to detect where the attendee's eyes are looking, or the number or location of persons or faces in view of the sensor 1322 (e.g., a camera). The facial recognition software may detect particular locations on attendee devices 1320 where the attendees are looking, which may indicate which portion of the content the attendees are currently viewing (or not viewing). For example, a presenter may be talking about a first bullet point on a slide for several minutes, but the facial recognition software may detect that 90% of attendees were viewing a subsequent bullet point, indicating that the attendees were moving faster through the content than the presenter. Additionally, the facial recognition software may determine what portion of the attendees are looking at the attendee devices 1320 versus a different location entirely (e.g., five attendees were present and one was looking at attendee device 1320).

In various embodiments, the sensor data processing software may comprise voice analysis software. The voice analysis software may be configured to analyze the words, tones, or sounds captured by the sensors 1322 (e.g., a microphone). For example, the voice analysis software may detect words typically associated with a positive attendee response, such as "interesting," "great," "ground-breaking," or the like. The voice analysis software may detect words typically associated with a negative attendee response, such as "boring," "outdated," "whatever," and/or the like. Additionally, the voice analysis software may detect the tone of attendee voices to determine the general mood or interest level of attendees. The voice analysis software may also detect noises such as coughs or snoring, which may indicate a negative attendee response to the content, or other noises which indicate a positive attendee response. In various embodiments, the voice analysis software may calculate an interest score, such as from 1-100, with a score of 100 indicating that all attendees are engaged in the content, and a score of 1 indicating that the attendees are ignoring or reacting negatively to the content.

In various embodiments, the voice analysis software may implement various artificial intelligence, machine learning, and/or statistical analysis techniques to aid in calculating the interest score. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. For example, and in accordance with various embodiments, the voice analysis software may implement machine learning algorithms and models to aid in calculating the interest score. The voice analysis software may implement any suitable machine learning model or algorithm, statistical data model, or the like, and may be supervised or unsupervised. For example, exemplary unsupervised models may include clustering and dimensionality reduction, LDA topic modeling, and/or any other unsupervised machine learning model. For example, exemplary supervised models may include classification models, regression models, sentiment analysis techniques, and/or any other supervised machine learning model. In various embodiments, machine learning networks and/or subject matter experts may initially supervise the model. In various embodiments, the machine learning model may comprise random forest models, gradient boosting models, or any other suitable or desired model. In various embodiments, machine learning service 140 may also implement reinforcement learning techniques to enhance the machine learning algorithm and/or statistical data models.

In various embodiments, the sensor data processing software may comprise thermal analysis software. The thermal analysis software may be configured to analyze the sensor data to provide feedback to the presenting device 1310. For example, the thermal analysis software may detect the number of attendees or individuals in a room, as well as an increase or decrease in the number of individuals in the room. The thermal analysis software may determine the distance, and change in distance, between attendees, which may indicate that attendees are coming together or drifting apart. Additionally, the thermal analysis software may detect attendee interest in the presentation, such as by detecting an increase (or decrease) in surface body temperature in attendees, which may indicate an increased (or decreased) heart rate and increased (or decreased) interest in the presented content.

In response to the sensor data processing software generating the feedback, the sensor data processing software may transmit or display the feedback on the presenting device 1310. The feedback may be transmitted or displayed in real time, or near real time. In various embodiments, the feedback may be transmitted or displayed as textual feedback, such as the number of attendees viewing the content.

In various embodiments, the feedback may be transmitted or displayed graphically, such as in a heatmap showing where on the screen attendees are looking. In various embodiments, the feedback may also include active feedback transmitted by one or more attendee devices 1320, via presentation UI 1315. For example, the active feedback may comprise questions transmitted by one or more attendees, a live poll, and/or the like.

Figure 8:
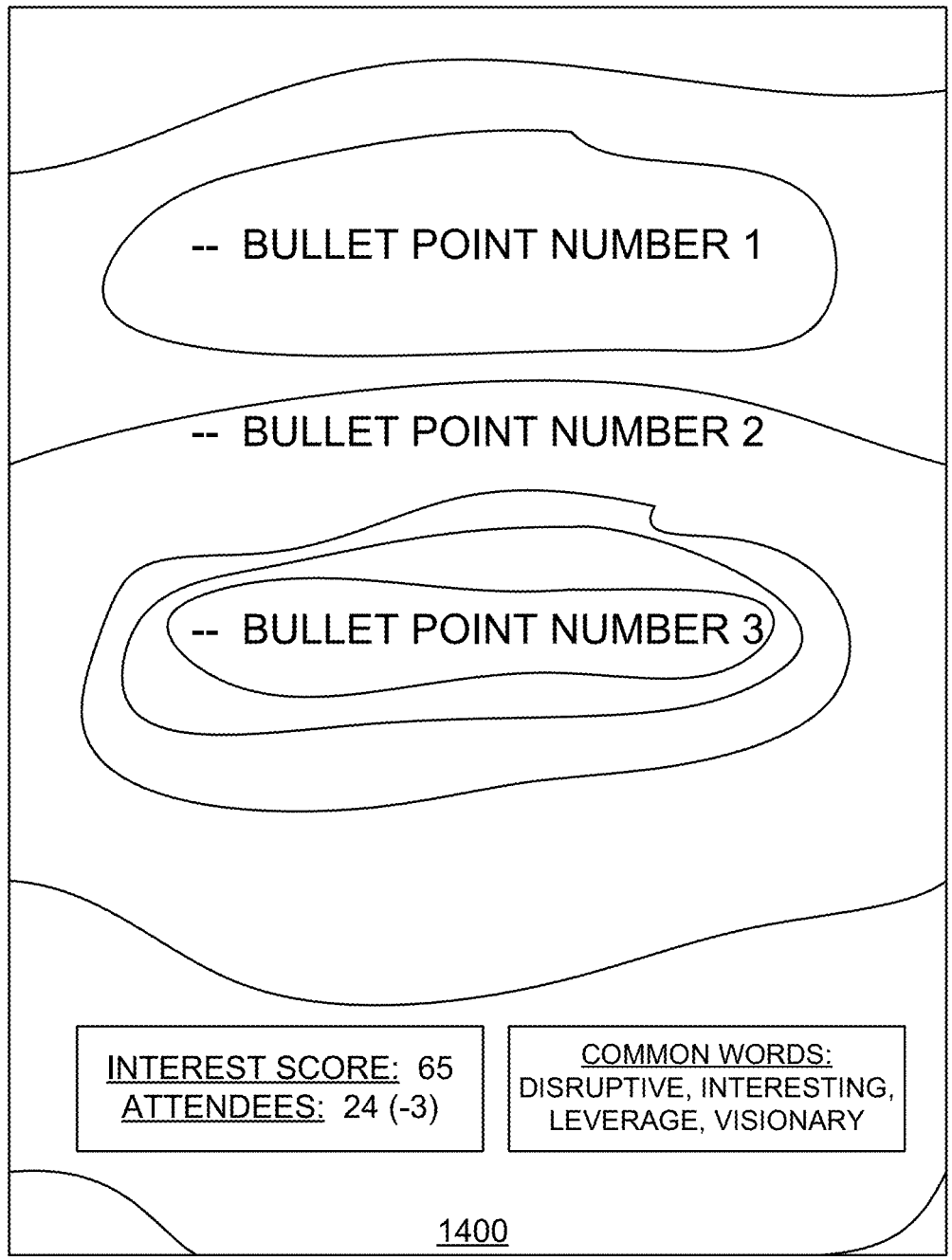
FIG. 8 illustrates a feedback screen according to various embodiments.

Referring to FIG. 8, a feedback screen 1400 is illustrated according to various embodiments. The feedback screen 1400 may comprise a heatmap. The heatmap may be displayed on the presenting device and show the presenter where attendees are looking on the attendee devices. In various embodiments, the locations where attendees are looking may be showed in different colors, shading patterns, or with contour lines. The heatmap may be overlaid over the content, so that the presenter can easily view the content being presented simultaneously as the feedback. For example, the content may comprise three bullet points, and the contour lines may indicate that the majority of attendees are viewing the third bullet point.

The feedback screen may also contain textual data. The textual data may include, for example, the interest score from the voice analysis software, as well as the number of attendees and an increase or decrease in the number of attendees from the thermal analysis software. The feedback screen may also include the words most frequently being spoken by attendees viewing the content.

Figure 9:
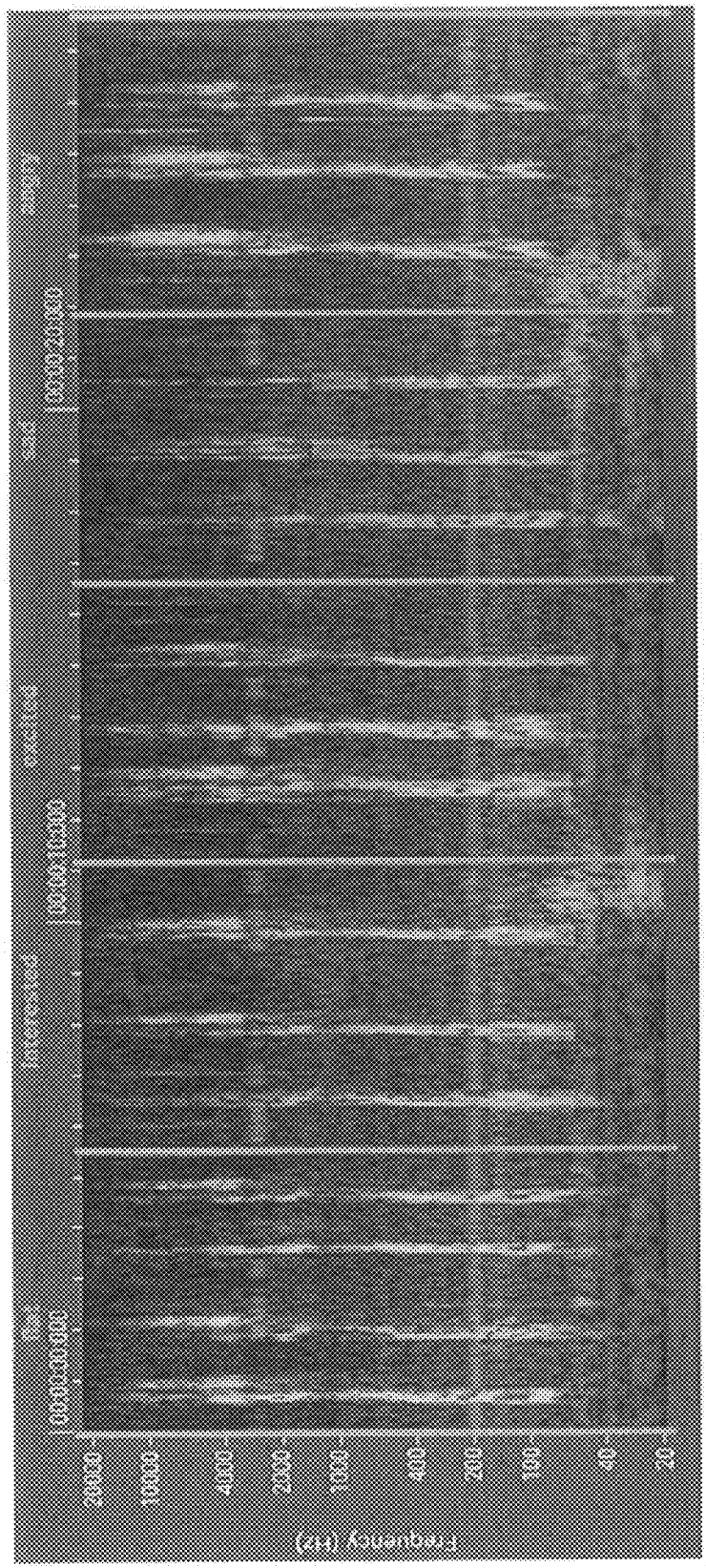
FIG. 9 illustrates a series of audio clips according to various embodiments.

Referring to FIG. 9, a series of audio clips is illustrated according to various embodiments. The audio clips show differences in mood between audio clips. Each section shows the same speaker saying the word "yes" three times, with the exception of the "flat" section, which shows the speaker saying the word "yes" four times. As illustrated, the vertical axis represents frequency, the horizontal axis represents time, and the color represents volume, where black is quiet and grey or white is loud. The "flat" section is a control section to show a normal flat voice. The "interested" section shows the most general complete filling of the natural voice range (the most grey or white filled in between 65-165 Hz). The "excited" section shows a spikey and rapid change in frequency in the 65-165 Hz range, exemplified by larger grey and white lines going from left to right. The "sad" section illustrates more harmonic series amplitude in the 700-1400 Hz range. The "angry" section shows more harmonic series amplitude in the 5500-12000 Hz range. These are a few basic examples of how the voice analysis software may detect moods. In various embodiments, any suitable voice analysis software may be used, and the voice analysis software may detect moods using any suitable technique or process.

Figure 10:
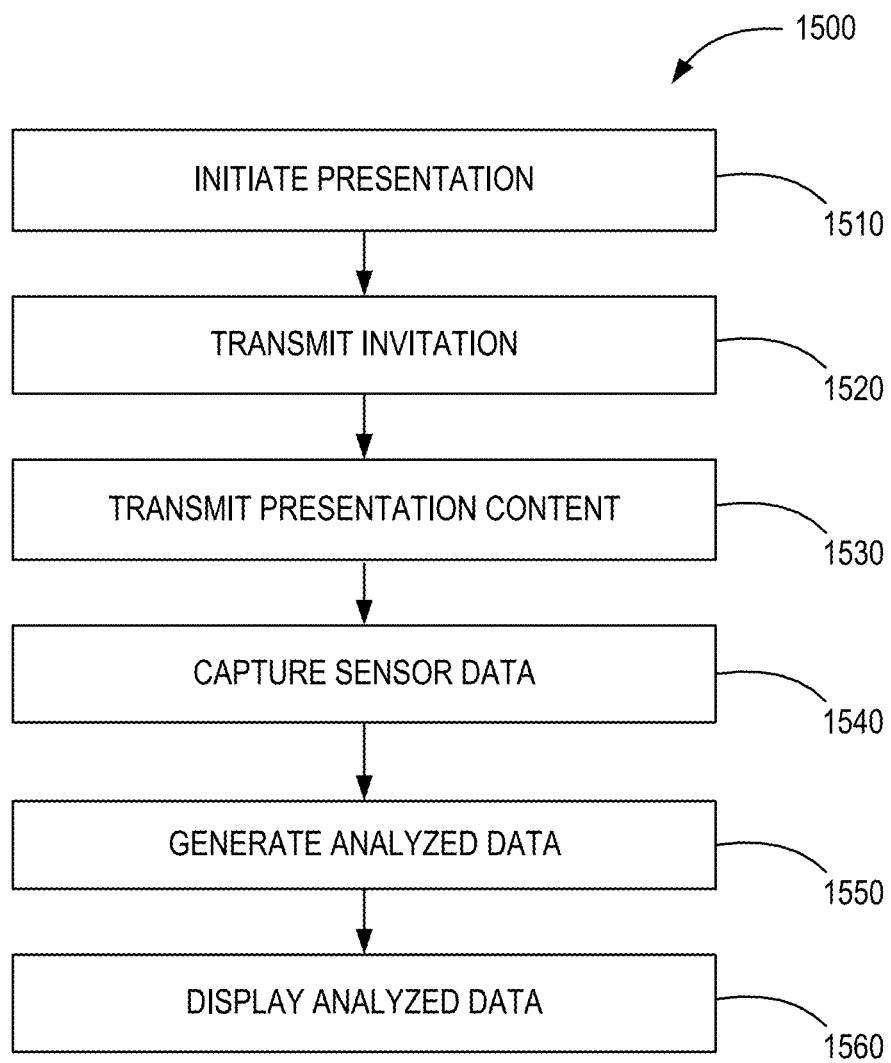
FIG. 10 illustrates a flowchart of a process for presenting feedback according to various embodiments.

Referring to FIG. 10, a flowchart 1500 of a process for presenting content is illustrated according to various embodiments. A presenting device may initiate a presentation of content (step 1510). In various embodiments, the content may be stored on the presenting device, a portable storage device, or a remote server. The content may comprise static content or dynamic content. The presenting device may transmit an invitation to attendee devices (step 1520). For example, the user of the presenting device may enter email addresses, phone numbers, names, or select attendees from a list of nearby devices discovered by the presenting device or a portable storage device. The presenting device may transmit presentation content to the attendee devices (step 1530). In various embodiments, the presentation content may be transmitted or streamed to the attendee devices from or via the presenting device or the portable storage device. In that regard, the presenting device (or the portable storage device) and the attendee devices may be in communication via a common network. The network may comprise the internet. The network may also comprise a local area network (LAN) or may be made available via a travel network router (e.g., travel wireless router) or through any other suitable means. The presentation content displayed on the attendee devices may mirror the presentation content on the presenting device. In various embodiments, the presentation content displayed on the attendee devices may be controlled by the presenting device, such that the presentation content displayed on the attendee device may not mirror the presentation content display on the presenting device.

In various embodiments, the presenting device may also provide the presented content in downloadable form to the attendee devices. In various embodiments, the presented content may be displayed to each attendee device together with one or more engagement feedback tools. For example, an engagement feedback tool may comprise a live poll, a question and answer feature, a chat feature, a contact information exchange feature, a screen sharing or hand raising functionality, and/or the like. In that regard, the engagement feedback tool may allow communications between the presenting device and each respective attendee device.

Sensors on the attendee devices may capture data from the attendees (step 1540). In various embodiments, the attendee may be prompted for permission to share sensor data with the presenting device. The attendee devices may transmit the sensor data to the presenting device. The sensors may capture and transmit the sensor data to the presenting device in real time, or near real time. In various embodiments, the attendee devices may transmit the sensor data to the portable storage device. In various embodiments, the attendee devices may transmit the sensor data at regularly scheduled intervals, such as once per second, or once per tenth of a second. In various embodiments, the captured data may also include data captured from the engagement feedback tool.

Sensor data processing software may analyze the sensor data and generate an output of analyzed data (step 1550). The sensor data processing software may be located on the portable storage device, the presenting device, one or more attendee devices, or a cloud computing system. If the sensor data processing software is located in a cloud computing system, the portable storage device or presenting device may transmit the sensor data to the cloud computing system and receive the analyzed data. The presenting device may display the analyzed data (step 1560). Thus, the presenter may view the analyzed data while presenting the content, which may allow the presenter to modify the current presentation or modify subsequent presentations. The portable storage device or the presenting device may store the analyzed data for future reference for the presenter.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship, and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, a user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location-based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

In various embodiments, components, modules, and/or engines of any system described herein, or one or more subcomponents of any system, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (i.e., 192.168.1.1). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art and are covered in many standard texts. As a further example, representational state transfer (REST), or RESTful, web services may provide one way of enabling interoperability between applications.

In various embodiments, one or more servers discussed herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

Terms and phrases similar to "associate" and/or "associating" may include tagging, flagging, correlating, using a look-up table, or any other method or system for indicating or creating a relationship between data elements. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via a software enabled link, wherein the link may be sent via an email, text, post, social network input, and/or any other method known in the art.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in one or more databases, may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

In various embodiments, the software elements of the system may also be implemented using a JAVASCRIPT® run-time environment configured to execute JAVASCRIPT® code outside of a web browser. For example, the software elements of the system may be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

transmitting, by a presenting device, a presentation content to an attendee device via a standard communication protocol, wherein the presenting device and the attendee device are in electronic communication;

receiving, by the presenting device, sensor data from the attendee device, wherein the sensor data is captured by the attendee device in response to the presentation content being displayed on the attendee device; and displaying, by the presenting device, the sensor data on the presenting device, wherein the sensor data is displayed with the presentation content on the presenting device;

analyzing, by the presenting device, the sensor data;

generating, by the presenting device, an analyzed sensor data based on the sensor data, wherein the analyzed sensor data is generated using sensor data processing software;

displaying, by the presenting device, the analyzed sensor data on the presenting device, wherein the sensor data is displayed with the presentation content; and receiving, by the presenting device, the sensor data from the attendee device via the standard communication protocol, wherein each of the presenting device and the attendee device are configured to communicate via the standard communication protocol by transmitting a standard communication protocol header with at least one of a packet or datagram to identify the packet or datagram as following the standard communication protocol, wherein the standard communication protocol defines the ability for the presenting device and the attendee device to discover one another, to request the transfer of the presentation content and the sensor data, to transmit confirmations on the receipt of the presentation content and the sensor data, and to transmit the presentation content and the sensor data.

2. The method of claim 1, further comprising:
prepending, by the presenting device, the standard communication protocol header to the packet or datagram.

3. The method of claim 2, wherein the sensor data processing software comprises at least one of a facial recognition software, a voice analysis software, or a thermal analysis software.

4. The method of claim 2, further comprising displaying, by the presenting device, the analyzed sensor data overlaid on the presentation content.

5. The method of claim 1, wherein the sensor data comprises locations where an attendee is looking on the attendee device.

6. The method of claim 5, further comprising:
generating, by the presenting device, a heatmap based on the locations; and
displaying, by the presenting device, the heatmap overlaid on the presentation content.

7. The method of claim 5, further comprising displaying, by the presenting device, a number of attendees currently viewing the presentation content based on the locations.

8. The method of claim 7, further comprising determining, by the presenting device and based on the sensor data, a change in the number of attendees viewing the presentation content.

9. The method of claim 1, wherein the presentation content is simultaneously displayed on the attendee device and the presenting device.

10. A computer-based system comprising:
a processor; and
a tangible, non-transitory memory configured to communicate with the processor, the tangible, non-transitory memory having instructions stored thereon that, in response to execution by the processor, cause the processor to perform operations comprising:
transmitting, by the processor, a presentation content to an attendee device via a standard communication protocol, wherein the computer-based system and the attendee device are in electronic communication via a network;
receiving, by the processor, sensor data from the attendee device, wherein the sensor data is captured by the attendee device in response to the presentation content being displayed on the attendee device;
displaying, by the processor, the presentation content;
analyzing, by the processor, the sensor data;
generating, by the processor, an analyzed sensor data based on the sensor data, wherein the analyzed sensor data is generated using sensor data processing software;
displaying, by the processor, the analyzed sensor data, wherein the sensor data is displayed with the presentation content;
receiving, by the processor, the sensor data from the attendee device via the standard communication protocol,
wherein each of the processor and the attendee device are configured to communicate via the standard communication protocol by transmitting a standard communication protocol header with at least one of a packet or datagram to identify the packet or datagram as following the standard communication protocol,
wherein the standard communication protocol defines the ability for the processor and the attendee device to discover one another, to request the transfer of the presentation content and the sensor data, to transmit confirmations on the receipt of the presentation content and the sensor data, and to transmit the presentation content and the sensor data.

11. The computer-based system of claim 10, wherein the operations further comprise:
prepending, by the processor, the standard communication protocol header to the packet or datagram.

12. The computer-based system of claim 10, wherein the transmitting the presentation content comprises streaming the presentation content to the attendee device via the network.

13. The computer-based system of claim 10, wherein the network is provided by a travel wireless router.

14. The computer-based system of claim 10, wherein the network comprises an internet or a local area network (LAN).

15. The computer-based system of claim 10, wherein the sensor data is captured by at least one of a camera, a microphone, or a thermal imaging sensor.

16. The computer-based system of claim 10, further comprising a local storage in electronic communication with the processor, wherein the local storage is configured to store the presentation content.

17. The computer-based system of claim 10, further comprising a portable storage device in electronic communication with the processor, wherein the portable storage device is configured to store the presentation content.

18. The computer-based system of claim 17, wherein the portable storage device is configured to communicate wirelessly via the network to the attendee device and the computer-based system.

19. A method comprising:
discovering, by a computer-based system, an attendee device in electronic communication with a network, wherein the network is a local area network (LAN);
transmitting, by the computer-based system, an invitation to the attendee device to view a presentation content;
transmitting, by the computer-based system, the presentation content to the attendee device in response to the attendee device accepting the invitation, wherein the presentation content comprises a presentation and an engagement feedback tool; and
displaying, by the computer-based system, the presentation content, wherein in response to the presentation content being displayed, the presentation content is displayed on the attendee device,
wherein the computer-based system is configured to communicate with the attendee device via a standardized communication protocol by transmitting a standardized communication protocol header with at least one of a packet or datagram to identify the packet or datagram as following the standardized communication protocol,
wherein the standard communication protocol defines the ability for the computer-based system and the attendee device to discover one another, to request the transfer of the presentation content and the engagement feedback tool, to transmit confirmations on the receipt of the presentation content and the engagement feedback tool, and to transmit the presentation content and the engagement feedback tool
receiving, by the computer-based system, the sensor data from the attendee device via the standard communication protocol,
wherein each of the presenting device and the attendee device are configured to communicate via the standard communication protocol by transmitting a standard communication protocol header with at least one of a packet or datagram to identify the packet or datagram as following the standard communication protocol, wherein the standard communication protocol defines the ability for the presenting device and the attendee device to discover one another, to request the transfer of the presentation content and the sensor data, to transmit confirmations on the receipt of the presentation content and the sensor data, and to transmit the presentation content and the sensor data.

20. The method of claim 19, wherein the method further comprises prepending, by the computer-based system, the standard communication protocol header to the packet or datagram.

21. The method of claim 19, wherein the engagement feedback tool comprises at least one of a live poll, a question and answer feature, a chat feature, a contact information exchange feature, a screen sharing feature, or a hand raising functionality.

\* \* \* \* \*